(12) United States Patent
White, Jr. et al.

(10) Patent No.: US 10,757,073 B2
(45) Date of Patent: *Aug. 25, 2020

(54) DELEGATED ACCESS CONTROL OF AN ENTERPRISE NETWORK

(71) Applicant: Cisco Technology, Inc., San Jose, CA (US)

(72) Inventors: David C White, Jr., Durham, NC (US); Jay K. Johnston, Raleigh, NC (US); Rama Darbha, Raleigh, NC (US); Magnus Mortensen, Cary, NC (US); Carlos M. Pignataro, Raleigh, NC (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/173,383

(22) Filed: Oct. 29, 2018

(65) Prior Publication Data
US 2019/0068552 A1 Feb. 28, 2019

Related U.S. Application Data

(63) Continuation of application No. 14/950,418, filed on Nov. 24, 2015, now Pat. No. 10,158,605.

(51) Int. Cl.
*G06F 21/62* (2013.01)
*H04L 29/06* (2006.01)
*G06F 21/45* (2013.01)

(52) U.S. Cl.
CPC ...... *H04L 63/0209* (2013.01); *H04L 63/0815* (2013.01); *H04L 63/102* (2013.01)

(58) Field of Classification Search
None
See application file for complete search history.

(56) References Cited

U.S. PATENT DOCUMENTS

| 7,562,382 B2* | 7/2009 | Hinton | H04L 63/0815 |
| | | | 709/225 |
| 7,617,522 B2* | 11/2009 | Schmidt | H04L 63/083 |
| | | | 713/170 |

(Continued)

OTHER PUBLICATIONS

Towards secure information sharing using role-based delegation. Ahn et al. Elsevier. (Year: 2007).*

(Continued)

*Primary Examiner* — Venkat Perungavoor
(74) *Attorney, Agent, or Firm* — Edell, Shapiro & Finnan, LLC

(57) ABSTRACT

Presented herein are techniques for enabling delegated access control of an enterprise network. In particular, data representing a trust chain formed between a local domain and a remote domain is stored in an identity management system. The local domain has an associated secure enterprise computing network and wherein the trust chain identifies one or more outside entities associated with the remote domain that are authorized to access the secure enterprise computing network. The identity management system receives a request for access to the secure enterprise computing network by a first outside entity of the one or more outside entities associated with the remote domain. Access by the outside entity to the secure enterprise computing network is controlled/determined based on an analysis of the trust chain.

20 Claims, 23 Drawing Sheets

(56) References Cited

U.S. PATENT DOCUMENTS

| | | | | |
|---|---|---|---|---|
| 7,953,979 | B2* | 5/2011 | Borneman | G06F 21/41 |
| | | | | 713/156 |
| 8,544,069 | B1* | 9/2013 | Subbiah | G06F 21/41 |
| | | | | 726/4 |
| 9,047,393 | B1* | 6/2015 | Grieve | G06F 9/54 |
| 2001/0005841 | A1 | 6/2001 | Wray | |
| 2001/0014943 | A1* | 8/2001 | Wray | H04L 9/3265 |
| | | | | 713/157 |
| 2002/0178249 | A1* | 11/2002 | Prabakaran | G06F 11/1451 |
| | | | | 709/223 |
| 2003/0120948 | A1 | 6/2003 | Schmidt et al. | |
| 2003/0130947 | A1 | 7/2003 | Benantar | |
| 2004/0088543 | A1* | 5/2004 | Garg | H04L 63/0815 |
| | | | | 713/157 |
| 2004/0128544 | A1* | 7/2004 | Hondo | H04L 63/0428 |
| | | | | 726/8 |
| 2005/0177715 | A1 | 8/2005 | Somin et al. | |
| 2006/0117389 | A1* | 6/2006 | Pool | G06F 21/6245 |
| | | | | 726/27 |
| 2006/0136990 | A1* | 6/2006 | Hinton | H04L 63/0815 |
| | | | | 726/2 |
| 2007/0220598 | A1 | 9/2007 | Salowey et al. | |
| 2008/0021997 | A1 | 1/2008 | Hinton | |
| 2008/0052203 | A1* | 2/2008 | Beyer | G06Q 10/087 |
| | | | | 705/28 |
| 2008/0091940 | A1* | 4/2008 | Dean | H04L 63/0823 |
| | | | | 713/157 |
| 2010/0229235 | A1* | 9/2010 | Dawson | H04L 9/006 |
| | | | | 726/22 |
| 2010/0269156 | A1* | 10/2010 | Hohlfeld | G06F 21/6218 |
| | | | | 726/4 |
| 2010/0306535 | A1 | 12/2010 | Jain et al. | |
| 2011/0047374 | A1* | 2/2011 | Liu | H04L 9/3265 |
| | | | | 713/156 |
| 2011/0066849 | A1 | 3/2011 | Niccolini et al. | |
| 2011/0246765 | A1 | 10/2011 | Schibuk | |
| 2011/0296517 | A1 | 12/2011 | Grigoriev et al. | |
| 2012/0030336 | A1 | 2/2012 | Monjas Llorente et al. | |
| 2012/0059922 | A1 | 3/2012 | Jason et al. | |
| 2010/0110632 | A1 | 5/2012 | Burghart | |
| 2012/0331540 | A1* | 12/2012 | Hoffman | H04L 9/3268 |
| | | | | 726/10 |
| 2014/0013447 | A1 | 1/2014 | Hotti | |
| 2014/0082365 | A1* | 3/2014 | Everhart | H04L 9/0833 |
| | | | | 713/175 |
| 2014/0208410 | A1 | 7/2014 | Dellago, Jr. | |
| 2015/0128264 | A1 | 5/2015 | White, Jr. et al. | |

OTHER PUBLICATIONS

TrustedRBAC—A Distributed Authorization Infrastructure Span Multiple Autonomous Domains. Wang et al. WUJNS. (Year: 2004).*

Consistency of User Attribute in Federated Systems. Pham et al. Springer-Verlag (Year: 2007).*

InnovationQ Plus Search Results (Year:2019).*

Michele Tomaiuolo, "Trust management and delegation for the administration of Web services" Organizational, Legal, and Technological Dimensions of Information System Administration, 2013, 17 pages.

Zissis et al., "Addressing cloud computing security issues", Future Generation Computer Systems, vol. 28, Issue 3, Mar. 2012, www.elsevier.com/locate/fgcs, 10 pages.

Kagal et al., "A Framework for Distributed Trust Management", Computer Science and Electrical Engineering Department, University of Maryland Baltimore County, 11 pages.

Nunez et al. BlindIDM: A privacy-preserving approach for identity management as a service. 2014.

Rifa-Pous et al., An Interdomain PKI Model Based on Trust Lists, LNCS(2007).

Kylau et al., Trust Requirements in Identity Federation Topologies, IEEE(2009).

Tang et al., Extending OpenStack Access Contorl with Domain Trust, LNCS(2014).

Chadwick et al., Adding support to XACML for multi-domain user to user dynamic delegation of authority, Springer (2009).

* cited by examiner

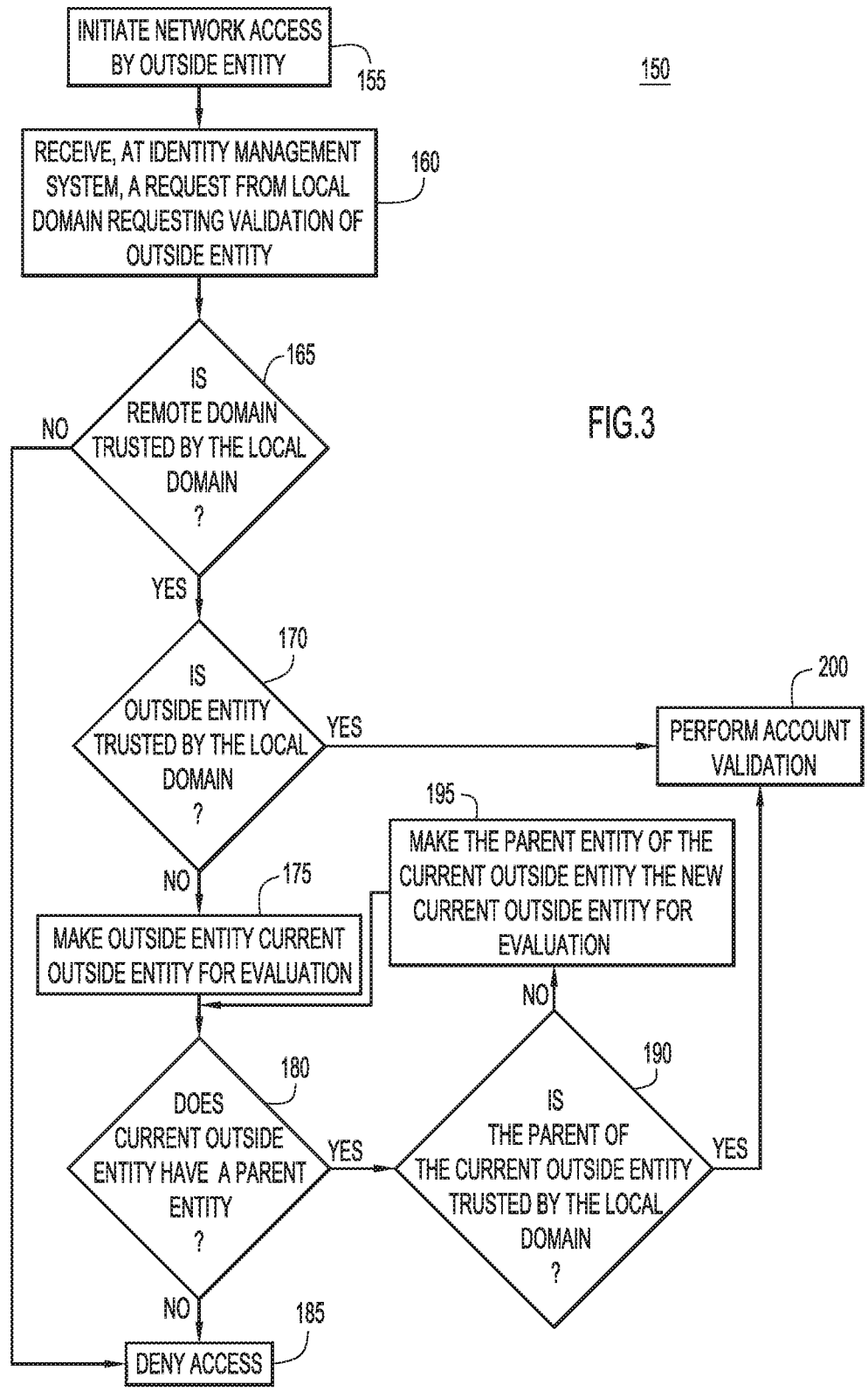

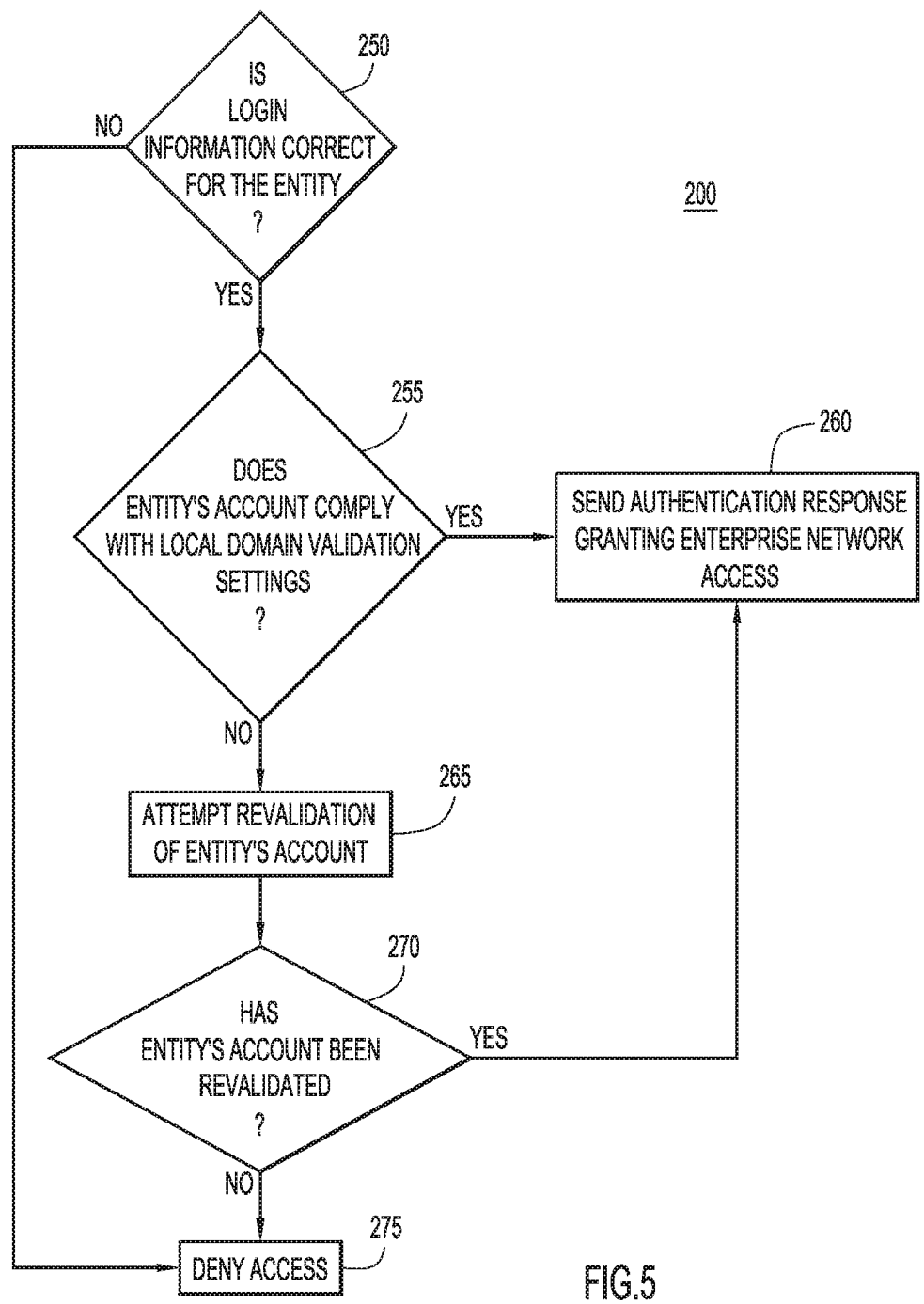

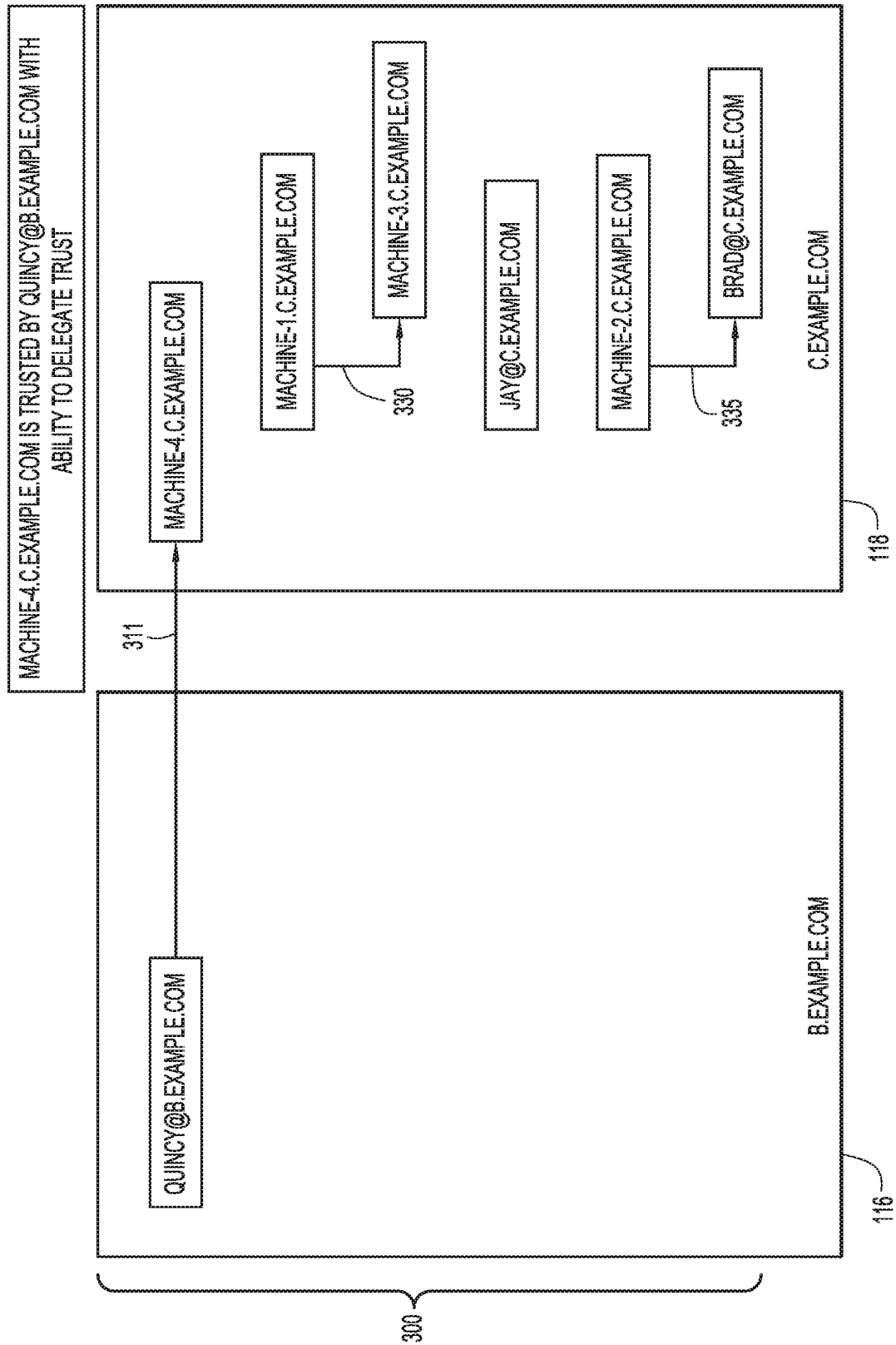

550

555 — STORING, IN THE AN IDENTITY MANAGEMENT SYSTEM, DATA REPRESENTING A TRUST CHAIN FORMED BETWEEN A LOCAL DOMAIN AND THE REMOTE DOMAIN, WHEREIN THE LOCAL DOMAIN HAS AN ASSOCIATED SECURE ENTERPRISE COMPUTING NETWORK AND WHEREIN THE TRUST CHAIN IDENTIFIES THE ONE OR MORE OUTSIDE DEVICE ENTITIES ASSOCIATED WITH THE REMOTE DOMAIN THAT ARE AS AUTHORIZED TO ACCESS THE SECURE ENTERPRISE COMPUTING NETWORK

560 — RECEIVING, AT THE IDENTITY MANAGEMENT SYSTEM, A REQUEST FOR ACCESS OF THE OUTSIDE DEVICE TO THE SECURE ENTERPRISE COMPUTING NETWORK BY A FIRST OUTSIDE ENTITY OF THE ONE OR MORE OUTSIDE ENTITIES ASSOCIATED WITH THE REMOTE DOMAIN

565 — CONTROLLING ACCESS BY THE OUTSIDE DEVICE ENTITY TO THE SECURE ENTERPRISE COMPUTING NETWORK BASED ON AN ANALYSIS OF THE TRUST CHAIN

FIG.11

DELEGATED ACCESS CONTROL OF AN ENTERPRISE NETWORK

CROSS REFERENCE TO RELATED APPLICATIONS

This application is a continuation of U.S. patent application Ser. No. 14/950,418, filed Nov. 24, 2015, entitled "Delegated Access Control of an Enterprise Network," the entire contents of which are hereby incorporated by reference.

TECHNICAL FIELD

The present disclosure relates to network access control.

BACKGROUND

Enterprise computing networks (enterprise networks) are networks deployed by enterprises (e.g., companies/businesses, universities, or other organizations) that enable users to, for example, share computing resources. Users within the enterprise premises (e.g., buildings, offices, production sites, etc.) locally access the network via endpoints/terminals (e.g., computers, mobile devices, etc.) that are connected to the enterprise network through a network attachment device within the premises. Often, an enterprise network is configured to interconnect multiple enterprise locations so that users at different locations can share computing resources.

Many enterprise networks are now configured to allow users to remotely access the network. In other words, the enterprise network allows user access through endpoints that are located at remote sites outside the enterprise premises. Remote sites may include, for example, a user's home or a public location that has Internet connectivity.

BRIEF DESCRIPTION OF THE DRAWINGS

FIG. 3 is a flowchart illustrating a method for controlling an outside entity's access to an enterprise network using an identity management system, according to an example embodiment.

FIG. 5 is a flowchart illustrating a method to validate an outside entity's account using an identity management system, according to an example embodiment.

FIGS. 6A-6D are diagrams illustrating the re-parenting of a portion of a trust chain, according to an example embodiment.

FIG. 11 is a high-level flowchart of a method, according to an example embodiment.

DESCRIPTION OF EXAMPLE EMBODIMENTS

Overview

Figure 1:
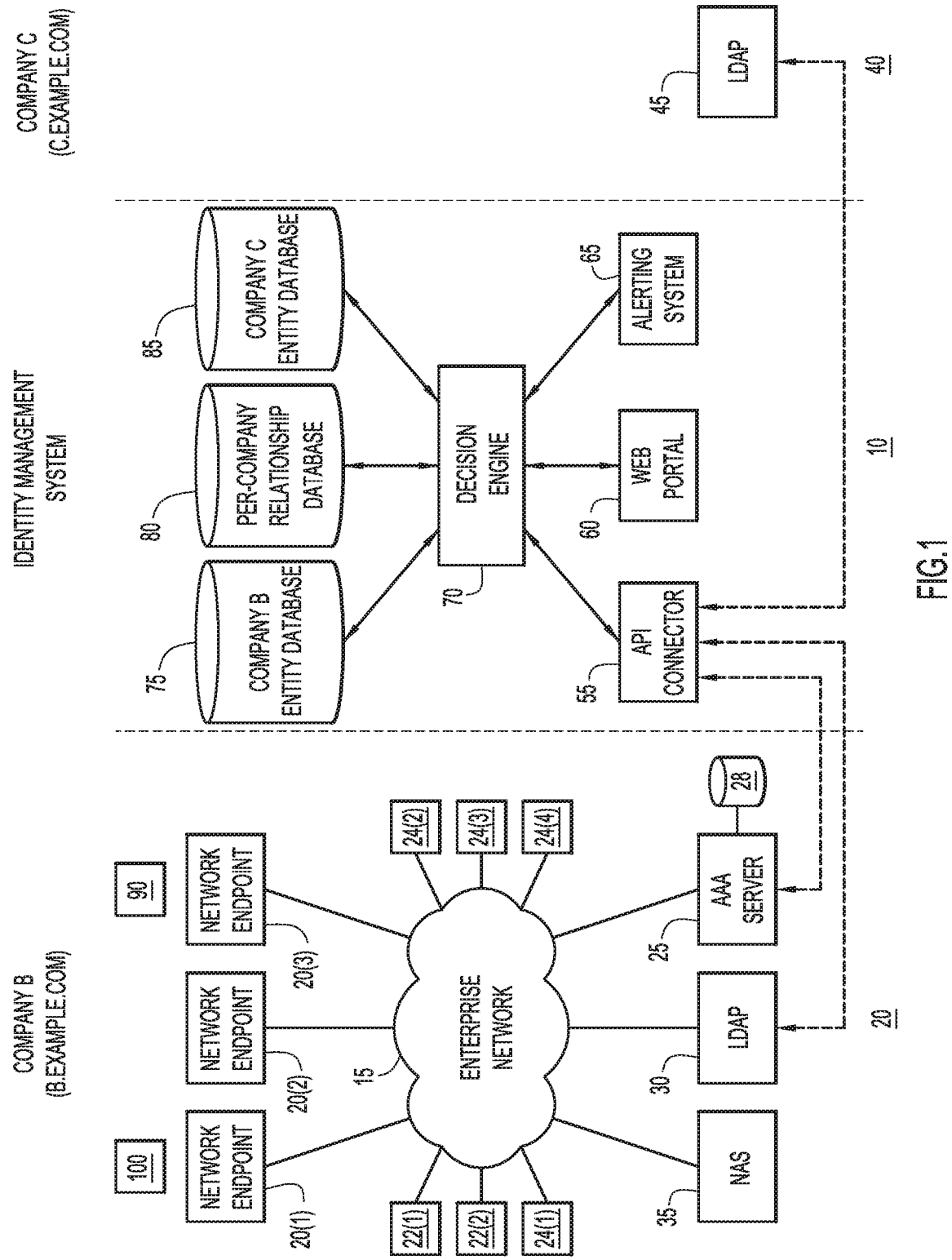
FIG. 1 is a block diagram illustrating an identity management system, according to an example embodiment.

Presented herein are techniques for enabling delegated access control of an enterprise network. In particular, data representing a trust chain formed between a local domain and a remote domain is stored in an identity management system. The local domain has an associated secure enterprise computing network and wherein the trust chain identifies one or more outside entities associated with the remote domain that are authorized to access the secure enterprise computing network. The identity management system receives a request for access to the secure enterprise computing network by a first outside entity of the one or more outside entities associated with the remote domain. Access by the outside entity to the secure enterprise computing network is controlled/determined based on an analysis of the trust chain.

Example Embodiments

Today, enterprises rely upon outside/partner organizations (e.g., third parties, partner companies, vendors, etc.) for various purposes. As such, employees, contractors, or other individuals (collectively and generally "users") associated with these partner organizations require access to the enterprise network. For example, users from a partner organization may visit an enterprise's physical location and need to obtain local network access (e.g., to gain outbound Internet access, access local devices, etc.). Alternatively, users from a partner organization may need to remotely connect into the enterprise network in order to, for example, access services on the enterprise network. As such, it is common for users of a partner organization to require local or remote access to an enterprise's computing network (enterprise network).

In addition to users, many enterprises now rely upon various devices/machines to perform various operations. For example, many companies (e.g., car manufacturers) now utilize robot devices, etc. that are provided, serviced, and controlled by third-parties. These third-party devices typically require specific access to the enterprise network and, potentially, enterprise network resources (e.g., network-connected computer devices, network-connected storage devices, etc.). In another example, a partner or contractor might need to gain access to an enterprise file server, but only when using a specific set of devices (e.g., designated computer, phone, etc.). Furthermore, there are real industry scenarios in which a device has the ability to control dependent devices, which in turn also need access to the enterprise network and/or enterprise network resources.

Enterprises currently struggle with the task of managing this "outside access" to the enterprise network. As used herein, "outside access" to an enterprise network refers to network access by entities (i.e., individuals and/or devices) that are not employed by, owned by, or otherwise directly associated with the enterprise, but instead are employed, owned, contracted, etc. by an outside partner organization (i.e., no direct relationship between the entity and the enterprise). Individuals who are not directly employed by, or directly associated with the enterprise are collectively and generally referred to herein as "outside users" or "partner employees." Devices that are not directly owned, leased or otherwise directly associated with the enterprise are collectively and generally referred to herein as "outside devices" or "partner devices." Outside users and outside devices are collectively and generally referred to herein as "outside entities."

In certain conventional arrangements, an administrator within the enterprise manually grants access to all outside entities requiring access to the enterprise network and resources (e.g., manually generate a whitelist for all partner employees/devices requiring enterprise network access). For example, in conventional arrangements, an administrator employed by the enterprise grants an outside entity access to the enterprise network by adding that outside entity into the enterprise's authentication, authorization and accounting (AAA) service/system, which is employed as a part of the enterprise's network security architecture with respect to applications such as network access or Internet Protocol (IP) mobility. This is a tedious process that, particularly in regards to individuals, encourages partner organizations to simply share a single set of access credentials between multiple individuals. For example, a partner organization employee may have other peers that also need access to the enterprise network. Obtaining access to the enterprise network for each individual is both time consuming and labor intensive (i.e., contact the enterprise network administrator, relay information to the network administrator, wait for actions by the network administrator, etc.). As such, the outside employee will typically avoid this process by simply sharing his/her enterprise network access (e.g., log-in credentials) with other remote employees of the partner organization. As a result, enterprises often do not have an understanding of which users of a partner organization may actually have access to the enterprise network. Additionally, the fact that multiple users share the same access credentials presents an increased security risk in that it increases the chance that the credentials could "leak" to users who should not be granted access to the enterprise network. With regards to devices, the enterprise often does not have control or knowledge of what devices are used to access the enterprise network as devices (e.g., bring-your-own devices) may be leased from or owned by the partner company.

Additionally, existing schemes for managing access to an enterprise network rely on the concept of presumed validation. For example, since a partner employee is only employed directly by the partner organization and not by the enterprise itself, the enterprise's AAA system lacks the ability to determine if the partner employee is, at any given time, still employed by the partner organization. Similarly, since an outside device is owned directly by the partner organization and not by the enterprise itself, the enterprise's AAA system lacks the ability to determine if the partner device is, at any given time, still owned by the partner organization. In other words, in conventional arrangements, due to the lack of a direct relationship between the partner entity (device or user) and the enterprise, the enterprise systems are not automatically updated when, for example, the partner companies change devices, a partner employee resigns, is terminated, changes positions, etc. That is, without manually entered changes, the enterprise's AAA service lacks the ability to determine when outside entities should be denied access to the enterprise network. Therefore, once an outside entity is granted network access, the access remains available until an administrator of the enterprise network takes steps to remove the outside entity's access (i.e., the partner entity is presumed to be valid). As result, the security of the enterprise network is jeopardized until the enterprise administrator is notified that an entity should no longer be granted access and the enterprise administrator initiates steps to remove that partner entity's access. This is also a concern when credentials are shared between multiple outside users.

The above issues pose significant issues for companies today and are becoming more problematic as more and more devices are placed in service and more and more operations are pushed to partner enterprises. As such, presented herein are techniques for managing outside access of entities (i.e., individuals and devices) to an enterprise network in a manner that simplifies the ability to grant access to multiple entities and to ensure access is granted only to active/current entities. More specifically, the techniques presented herein provide a cloud-based managed identity system, sometimes referred to as an identity management system, that creates "chains of trust" ("trust chains") by both trusting specific entities (individuals and devices) at partner organizations and delegating trust to those entities. This allows trusted partner entities, including outside devices, to manage a team of partner entities (outside users and/or outside devices) from their partner company to have access to the enterprise network. Entities, including outside devices or a device owned by the company ('inside device'), which have both been trusted and been given access to "delegate trust" can also trust other devices (and thus grant them access to the network). In addition, the identity management system performs periodic validation of outside entities and automatically removes "trust," and hence enterprise network access, for outside entities who no longer associated with (e.g., employed, owned, leased, etc.) at the partner organizations. Also as described further below, the trust chains, when broken, can be easily re-built through a re-parenting process. As used herein, access to an enterprise network refers to access to the enterprise network itself and, potentially, enterprise network resources (e.g., network-connected compute devices, network connected storage devices, etc.).

FIG. 1 is a block diagram illustrating an identity management system (managed identity system) 10 configured to enable an enterprise, sometimes referred to herein as "Company B," to manage outside access to its enterprise network 15 in accordance with examples presented herein. Merely for ease of illustration, the examples presented herein describe management of outside access to enterprise network 15 with reference to a single outside partner organization, sometimes referred to herein as "Company C." However, it is to be appreciated that the techniques presented herein may be utilized to manage access to enterprise network 15 by multiple outside partner organizations simultaneously.

In the example of FIG. 1, Company B maintains physical premises 20 that comprise one or more buildings, offices, production sites, etc. Within the premises 20 are a plurality of network endpoints or terminals 20(1)-20(3), enterprise network resources 22(1) and 22(2), a plurality of outside devices 24(1)-24(4), a policy control server 25, sometimes referred to as an authentication, authorization and accounting (AAA) server, a Lightweight Directory Access Protocol (LDAP) server 30, and a network access server (NAS) 35. The enterprise network 15 may be, for example, a local area network (LAN), a wide area network (WAN), etc. that comprises a network infrastructure (e.g., wires, cables, etc.), networking devices (e.g., switches, routers, gateways, access points, firewalls, etc.), and/or other network resources. The network endpoints 20(1)-20(3) are devices configured to enable users to connect to (i.e., access) the enterprise network 15. The network endpoints may comprise, for example, desktop computers, laptop computers, table computers, mobile phones, etc. The outside devices 24(1)-24(4) are computing devices that are directly associated with (i.e., owned, leased, etc.) by Company C, but which require access to enterprise network 15.

Examples presented herein are generally described with reference to outside devices that are owned/leased by Company C and/or outside users employed by Company C. It is to be appreciated that the operations of outside devices may also be performed, in certain examples, by "inside" devices. As used herein, inside devices are devices that are directly associated with (i.e., owned, leased, etc.) by Company B. Such devices may have the authority to automatically authorize network access to other devices owned by company B or Company C.

Company C also maintains one or more physical premises 40 that include an LDAP server 45. As described further below, the cloud-based identity management system 10 comprises an application programming interface (API) connector 55, a web portal 60, an alerting system 65, a decision engine 70, a database of Company B entities 75, a database of Company C entities 85, and a per-company relationship database 80. The API connector 55 is a web service that is served up externally to interconnect the identity management system 10 with one or more devices associated with Company B or Company C. The web portal 60 enables human interaction with the identity management system 10 to, as described further below, add entities, delegation authority, etc. As described further below, the alerting system 65 is configured to notify users of certain events (e.g., failed validations, trust chain changes, etc.), while the decision engine 70 processes user requests, identifies source requests, etc. Database 75 includes a list of all of the entities (users, devices, etc.) directly associated with Company B, while database 85 includes a list of all of the entities directly associated with Company C. As described further below, the databases 75 and 80 also store the relationships between entities within a specific company, including any internal trust linkages, as well as the entity attributes (e.g., whether or not a device or user has delegation authority). The database 80 includes mappings from Company B to Company C. Further details of these elements of cloud-based identity management system 10 are provided below.

Enterprise network 15 is configured to operate as a trusted/secured network in order to limit access to the network to only authorized and authenticated devices and users. However, as noted above, it is common for an enterprise, such as Company B, to provide access to its enterprise network 15 to outside entities. For example, an outside user 90 employed by partner Company C is onsite (i.e., within premises 20) and requires access to enterprise network 15 through network endpoint 20(3). When the outside user 90 may be onsite at Company B and need to gain outbound Internet access via the enterprise network 15. Additionally, outside devices 24(1)-24(4) are onsite (i.e., within premises 20) and require access to enterprise network 15. As such, user 90 and/or outside devices 24(1)-24(4) must each first authenticate to the network by responding to and sending a "network access request" to the network access server 35. The network access server 35 first attempts to authenticate each of the user 90 and/or outside devices 24(1)-24(4) by contacting the local AAA server 25 (i.e., determine if the outside devices 24(1)-24(4) are in a local authorization/authentication database 28). Outside user 90 and/or devices 24(1)-24(4) would only be in the local database 28 if a network administrator of Company B, such as an administrator 100 at network endpoint 20(1), manually added the outside entities into the database.

If user 90 and/or outside device 24(1)-24(4) have not been added to the local database 28, then the network access request is forwarded to the identity management system 10 via API connector 55. In accordance with examples presented herein, the identity management system 10 grants the user 90 and/or outside devices 24(1)-24(4) access to enterprise network 15 only if the decision engine 70 determines that the user 90 and/or outside devices 24(1)-24(4) are part of a valid cross-organizational trust chain formed between Company B and Company C and stored in the relationship database 80.

Figure 2A:
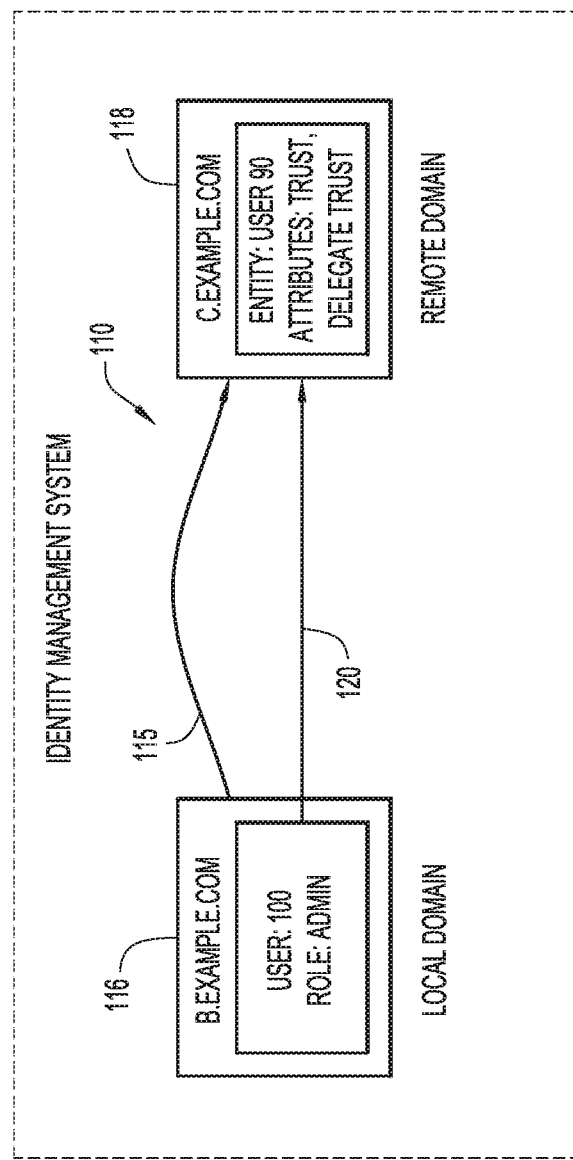
FIGS. 2A and 2B are diagrams illustrating a cross-organization trust chain, according to an example embodiment.

A cross-organizational trust chain requires two pieces, namely the creation of an "organization trust link" between two companies in the identity management system 10 and the creation of at least one "individual trust link" between entities at the two companies in the identity management system. For example, FIG. 2A is a diagram illustrating a cross-organizational trust chain 110 formed between Company B and Company C to enable authorized entities at Company C to access Company B's enterprise network 15. In this example, since the enterprise network 15 belongs to Company B, the domain for Company B, which in this example is "B.example.com," is referred to as the local domain 116, while the domain for Company C, which in this example is "C.example.com," is referred to as the remote domain 118. In FIG. 2A, arrow 115 represents the organizational link between Companies B and C (i.e., local domain forms a unidirectional trust link with remote domain). In practice, the organizational link 115 is a Company-to-Company authentication and authorization relationship that is stored in relationship database 80 which signifies that one or more entities at Company B have authorized entities at Company C to be granted access to enterprise network 15.

In FIG. 2A, arrow 120 represents a unidirectional individual trust link between an entity at Company B and an entity at Company C. To create the individual trust link 120, an entity with administrative rights at the local domain (i.e., B.example.com) conveys trust to, and additionally delegates trust authority to, an entity at the remote domain (i.e., C.example.com). In the example of FIG. 2A, an administrative user (administrator) 100 at Company B trusts an outside user 90 at Company C. In practice, the individual trust link 120 is an entity-to-entity authentication and authorization relationship that is stored in relationship database 80 which signifies that a specific entity at Company B has authorized a specific entity at Company C to have access to enterprise network 15. In an individual trust link, an entity that grants trust to another entity is sometimes referred to herein as the "parent" entity and the entity that receives trust is sometimes referred to herein as the "child" entity.

As noted, FIG. 2A illustrates a specific individual trust link formed between a user of Company B and an outside user of Company C. It is to be appreciated that this relationship is merely illustrative and, in another example, a user of Company B may trust a device at Company C to form the unidirectional individual trust link 120. In still other examples, a device of Company B may trust a user or device at Company C to form the unidirectional individual trust link 120.

A feature of a cross-organizational trust chain, such as cross-organizational trust chain 110 shown in FIG. 2A, is that, in relationship database 80, a trusted outside entity (e.g., outside user 90) may be coupled/associated with various properties/attributes. A first attribute is the "Trust" attribute, meaning that that the outside entity has been trusted by another entity in either Company B or Company C. In the case of the creation of the initial individual trust link 120 forming a new cross-organizational trust chain 110, the outside entity must be trusted by an entity at Company B to be granted the Trust attribute. Another attribute that may be associated with a trusted outside entity is the "Delegate Trust" attribute. If an outside entity is associated with the Delegate Trust attribute, then that outside entity has the ability to trust additional entities. For example, as shown in FIG. 2A, outside user 90 has been granted the Delegate Trust attribute by user 100.

Figure 2B:
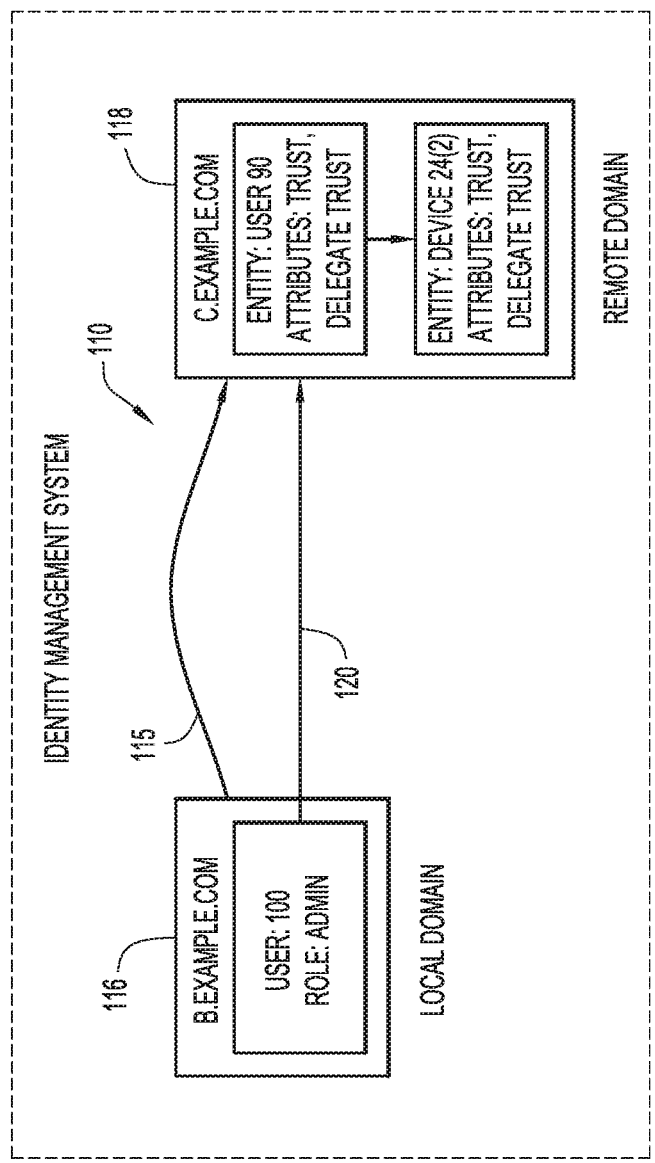

As described further below, when an outside entity (i.e., the entity's account in identity management system 10) is associated with the Delegate Trust attribute, the outside entity has the ability to pass the Trust attribute on to other entities within the same domain. That is, an outside entity associated with both the Trust and Delegate Trust attributes may pass those properties on to another entity in their domain. However, outside entities associated with only the Trust attribute may not pass the Trust attribute on to other entities since they do not have delegation authority. As such, outside user 90 has the ability to trust other entities within Company C so as to grant them access to enterprise network 15. FIG. 2B illustrates an example in which outside user 90 has trusted another outside device 24(2).

In practice, entities associated with Company B and Company C have an account with the identity management system 10 (i.e., an identity management system account). In certain examples, users may create an identity management system account by registering with the identity management system 10 using their corporate email addresses.

In accordance with the examples presented herein, each outside device that has the ability to access a partner's enterprise network are first assigned a unique fully qualified domain name that links the outside device to their associated enterprise. In other words, the outside devices are granted a unique "identity" within the identity management system 10 that is coupled with the domain of the device's owner. As used herein, a device's "owner" is the entity that has direct management control over the device. For example, in the arrangement of FIG. 1, outside device 24(2) may be assigned "machine-24-2.C.example.com" as its unique fully qualified domain name, which allows the inference that the outside device 24(1) is under the delegated trust of Company C.

Devices may register with the identity management system 10 using their unique identity (i.e., unique fully qualified domain name) and one of a variety of machine-to-machine protocols. For example, an outside device may register itself with the identity management system 10 using an instant messaging protocol and presence protocol, such as the Extensible Messaging and Presence Protocol (XMPP). XMPP includes fields to indicate identity, provides security, and provides presence. As described further below, the examples presented herein couple together the identity, security, and presence features so that outside devices may register themselves with the identity management system 10.

It is to be appreciated that XMPP is merely illustrative and that other protocols or machine-to-machine communication mechanisms may be used to in accordance with examples presented herein. For example, a text messaging protocol (e.g., Short Message Service (SMS)), representational state transfer (REST), REST Uniform Resource Identifiers (URIs), the Session Initiation Protocol (SIP), scripts in cURL, or any generic Instant Message and Presence Protocol (IMPP) may alternatively be used to delegate trust to outside devices.

Once registered, the account of each entity has at least one associated "entity profile" that is stored in the corresponding company database 75 or database 85 (i.e., in the database of the enterprise to which they are directly affiliated/associated). The Trust, Delegate Trust, and other attributes are associated with an entity's profile on a per-company basis. For example, referring specifically to the example of FIG. 2A, the user profile of user 90 will be linked with a Company C's specific Trust attribute (i.e., indicating that user 90 is directly or indirectly trusted by a user at Company B) and a Company B specific Delegate Trust attribute (i.e., indicating that user 90 has been authorized to grant other users access to the enterprise network of Company B). Since users may work with different organizations, it is possible that a user's profile includes different attributes for different organizations. Referring specifically to the example of FIG. 2B, the entity profile of outside device 24(2) will be linked with a Company C's specific Trust attribute (i.e., indicating that outside device 24(2) is directly or indirectly trusted by an entity at Company B) and a Company B specific Delegate Trust attribute (i.e., indicating that outside device 24(2) has been authorized to grant other entities access to the enterprise network of Company B). Since entities may work with different organizations, it is possible that an entity's profile includes different attributes for different organizations.

Figure 4A:
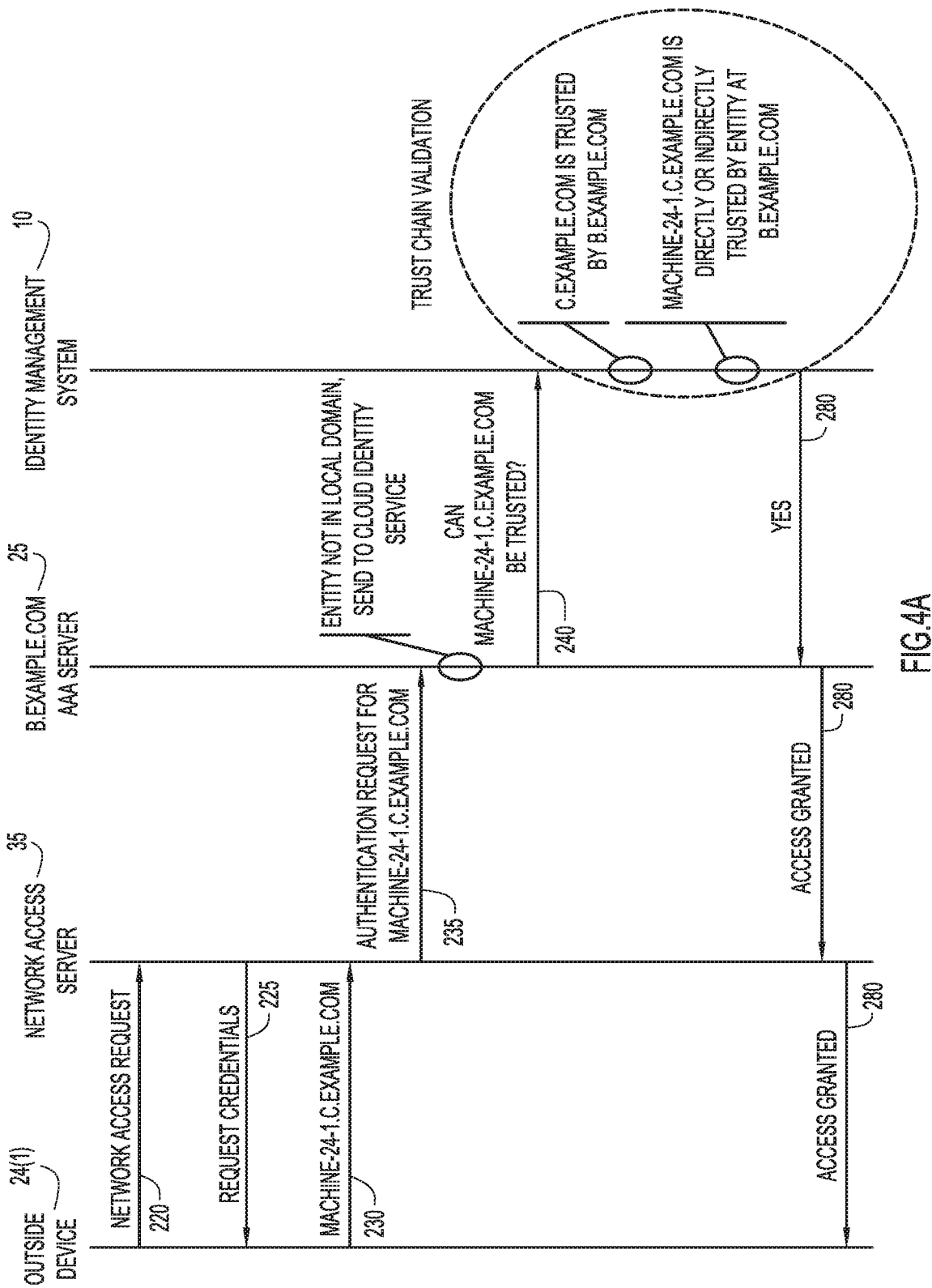
FIG. 4A is a ladder diagram illustrating messages exchanged to control an outside entity's access to an enterprise network using an identity management system, according to an example embodiment.

As noted above, through the creation of an organizational link and one or more individual trust links, a cross-organizational trust chain may be formed between Company B and Company C. Once an outside entity is part of a trust chain, the outside entity may attempt to access enterprise network 15 either onsite at the enterprise premises 20 or from a remote location. When an outside entity requests access to the enterprise network, the outside entity's access is first validated by the local AAA server, and once it is determined that the entity is part of an outside organization, the request is sent to the cloud-based identity management system 10. FIG. 3 is a flowchart of a method 150 performed for controlling an outside entity's access to an enterprise network using an identity management system in accordance with examples presented herein. FIG. 5 is a flowchart of a method 200 performed to validate the identity management system account of an outside entity in accordance with examples presented herein. FIG. 4A is a ladder diagram illustrating messages exchanged in the methods of FIGS. 3 and 5. For ease of illustration, methods 150 and 200 will be described with reference to the ladder diagram of FIG. 4A and with reference to the general arrangement of FIG. 1.

Referring first to FIG. 3, method 150 begins at 155 where an outside device 24(1) initiates access to enterprise network 15. In the specific example of FIG. 3, the outside device 24(1) is onsite. As shown in FIG. 4A, to initiate access, the device 24(1) attempts to connect to the local network at B.example.com, and sends a network access request 220 to the Network Access Server 35 in the local domain B.example.com.

In response to receipt of the network access request 220, the Network Access Server 35 sends, back to outside device 24(1), a request 225 for the entities access credentials. In the case of an outside user, the access credentials may be the username, password, domain, etc. of the user. In the case of an outside device, the access credentials may be the device's unique identity and/or other log-in information (e.g., domain, protocol, port, username, password, etc.).

Upon receipt of the request 225, the entity sends a response 230 back to the Network Access Server 35 with the requested credentials. In the example of FIG. 4A, the response 230 includes the unique identity (e.g., machine-24-1) and the domain (C.example.com), collectively forming a unique fully qualified domain name for device 24(1). In the case of an outside user, such as outside user 90, the response 230 may include the requested username (e.g., User90), password (e.g., password) and the domain (C.example.com). An access request 235 is then forwarded to the AAA server 25. In the example of FIGS. 3 and 4A, the AAA server 25 determines that machine-24-1.C.example.com is not in the local domain and, as such, the AAA server 25 cannot validate the outside machine.

Returning to FIG. 3, since the AAA server 25 cannot validate machine 24(1), at 160 a network access request 240 is forwarded to the cloud-based identity management system 10 via API connector 55. To validate the access of outside device 24(1), identity management system 10 is configured to make two general determinations, namely whether (1) Company C (i.e., the remote domain) is trusted by Company B (i.e., the local domain); and (2) whether the outside device 24(1) is directly or indirectly trusted by an entity of Company B (i.e., whether outside device 24(1) is part of a valid cross-organizational trust chain).

More specifically, to determine if Company C is trusted by Company B, the decision engine 70 queries relationship database 80 to locate a pre-established organizational link between Company B and Company C. If an organizational link between Company B and C cannot be located, then method 150 ends at 185 where outside device 24(1) is denied access to enterprise network 15. However, if, at 165, the decision engine 70 locates an organizational link between Company B and Company C, then method 150 proceeds to 170.

At 170, decision engine 70 is configured to determine if outside device 24(1) is directly trusted by a user at Company B. That is, decision engine 70 first queries database 85 to verify that the outside device 24(1) exists in the identity management system 10 (i.e., has an account). Decision engine 70 then queries database 80 to determine if there is an individual trust link between outside device 24(1) and an entity of Company B. If the outside device 24(1) is directly trusted by an entity at Company B, then method 150 ends at 199 where validation of the account of outside device 24(1) is initiated. Validation of the account of outside device 24(1) is described in greater detailed below.

However, if, at 170, the decision engine 70 determines that outside device 24(1) is not directly trusted by an entity at Company B, then the decision engine 70 attempts to determine if the outside device 24(1) is indirectly trusted by an entity at Company B. This determination is an iterative process represented in FIG. 3 by 180, 190, and 195.

More specifically, the process to determine if the outside device 24(1) is indirectly trusted by an entity at Company B begins at 175 where outside device 24(1) is made the "current outside entity" for evaluation purposes. At 180, decision engine 70 queries database 85 to determine whether the current outside entity has a parent entity (i.e., has the current entity been trusted by another entity in Company C). If the current outside entity does not have a parent, then method 150 ends at 185 where the outside device 24(1) is denied access to enterprise network 15. The outside device 24(1) is denied access because, as noted above, the outside device 24(1) is not directly trusted by an entity at Company B and, without a parent entity, the outside device 24(1) cannot be indirectly trusted by an entity at Company B.

Returning to 180, if decision engine 70 determines that the current outside entity has a parent entity, then method 150 proceeds to 190 where the decision engine 70 queries database 80 to determine if the identified parent entity is directly trusted by an entity at Company B (i.e., to determine if there is an individual trust link between outside device 24(1) and an entity of Company B). If the identified parent entity is directly trusted by an entity at Company B, then method 150 ends at 199 where validation of the account of outside device 24(1) is initiated. In other words, outside device 24(1) has been determined to be indirectly trusted by an entity at Company B through the identified parent entity. However, if the identified parent entity is not directly trusted by a user at Company B, then method 150 proceeds to 195 where the identified parent entity is made the "current outside entity" for evaluation purposes. The iterative process represented by 180, 190, and 195 continues until either the current outside entity does not have a parent entity (resulting in access denial for outside device 24(1)) or an identified parent entity is directly trusted by an entity at Company B (initiating account validation).

As noted above, FIG. 5 is a flowchart illustrating the method 200 that is performed when decision engine 70 (1) determines that Company C is trusted by Company B, and (2) outside device 24(1) is directly or indirectly trusted by an entity of Company B. More specifically, method 200 begins at 250 where decision engine 70 queries Company C database 85 to determine whether login information provided by outside device 24(1) in the response 230 (FIG. 4A) is correct. If the login information is not correct, then method 200 proceeds to 275 where outside device 24(1) is denied access to enterprise network 15. However, if it is determined that the login information is correct, then method 200 proceeds to 255.

At 255, the decision engine 70 queries database 85 to determine whether the account of outside device 24(1) complies with validation settings selected for the Company B. These validation settings are dictated by Company B when the organizational link is created between Companies B and C. In one example, the validation settings require that entities of Company C be re-validated at certain time intervals (e.g., once a day, once a week, once a month, etc.). Therefore, in such examples, at 255 the decision engine 70 determines whether the account of outside device 24(1) has previously been validated within a predetermined time period set by Company B. If decision engine 70 determines that the account of outside device 24(1) has previously been validated within the predetermined time period, then method 200 proceeds to 260 where the identity management system 10 sends an authentication response to AAA server 25 indicating that outside device 24(1) should be granted access to enterprise network 15. The authentication response, which is shown in FIG. 4A by arrow 280, may then be forwarded by the AAA server 25 to network endpoint 20(3), thereby granting outside device 24(1) access to enterprise network 15.

It is to be appreciated that validation/re-validation at certain time intervals is one specific example of validation settings that may be dictated by Company B. In other examples, outside devices may be validated/re-validated based on, for example, a specific protocol, port, domain, with a specific set of credentials, etc.

Returning to 255, if the decision engine 70 determines that the account of outside device 24(1) has not been validated in accordance with the selected validation settings, then method 200 proceeds to 265 where the identity management system 10 attempts to revalidate the account of outside device 24(1). Methods for revalidation of the account of outside device 24(1) are described in greater detail below.

At 270, decision engine 70 determines whether the account of outside device 24(1) has been successfully revalidated. If the account of outside device 24(1) cannot be revalidated, then method 200 proceeds to 275 where outside device 24(1) is denied access to enterprise network 15. However, if the account of outside device 24(1) is successfully revalidated, then method 200 proceeds to 260 where the identity management system 10 sends the authentication response 280 (FIG. 4A) to AAA server 25 indicating that outside device 24(1) should be granted access to enterprise network 15.

The account of an outside entity is initially validated when the entity is registered with the identity management system 10 and may be re-validated in accordance with validation settings selected by the local domain. The account of an outside user is initially validated when the user registers with the identity management system 10 and may be re-validated in accordance with validation settings selected for a local domain. In one example, validation/re-validation is performed using the email address of an outside user. For example, the account of outside user in identity management system has an associated email address (e.g., User90mail@.C.example.com). To validate/re-validate the identity management system account of user 90, the identity management system 10 generates a validation request to send a validation email to the email address associated with the account of user 90. The validation email includes a validation link (i.e., a validation request). The user 90 validates/re-validates his/her account by clicking the link in the email to generate a validation response sent back to the identity management system 10. Upon receipt of the validation response, the identity management system 10 determines that user 90 is validated/re-validated.

In the email validation mechanism described above, the identity management system 10 issues an email-based validation request and then receives a validation response when the user clicks the validation link. In accordance with examples presented herein, the validation request and/validation response may take other forms. For example, in an alternative arrangement, an instant messaging protocol (e.g., the Extensible Messaging and Presence Protocol (XMPP), a text messaging protocol (e.g., Short Message Service (SMS)), or other protocol may be used to send a validation request and/or receive a validation response.

In the case of outside devices, the validation/re-validation is performed using machine-to-machine interactions/protocols (i.e., direct communication between the identity management system 10 and the outside device). For example, XMPP, SMS, (REST), REST URIs, SIP, scripts in cURL, a generic IMPP, or other machine-to-machine communication mechanism may be used to send a validation request and/or receive a validation response (i.e., to delegate trust to outside devices).

As noted above, FIG. 1 illustrates an arrangement that includes LDAP server 30 at premises 20 of Company B and LDAP server 45 at premises 40 of Company C. The presence of these optional LDAP servers 30 and 45 enables an alternative validation/re-validation mechanism. More specifically, the LDAP servers 30 and 45 may each be accessible to identity management system 10. In such examples, the identity management system 10 may directly query, for example, LDAP server 45 of Company C to determine if outside device 24(1) is still an authorized device at Company C (i.e., perform a direct lookup against Company C's authentication service). If so, the identity management system 10 determines that outside device 24(1) is still a valid entity for access to enterprise network 15.

Figure 4B:
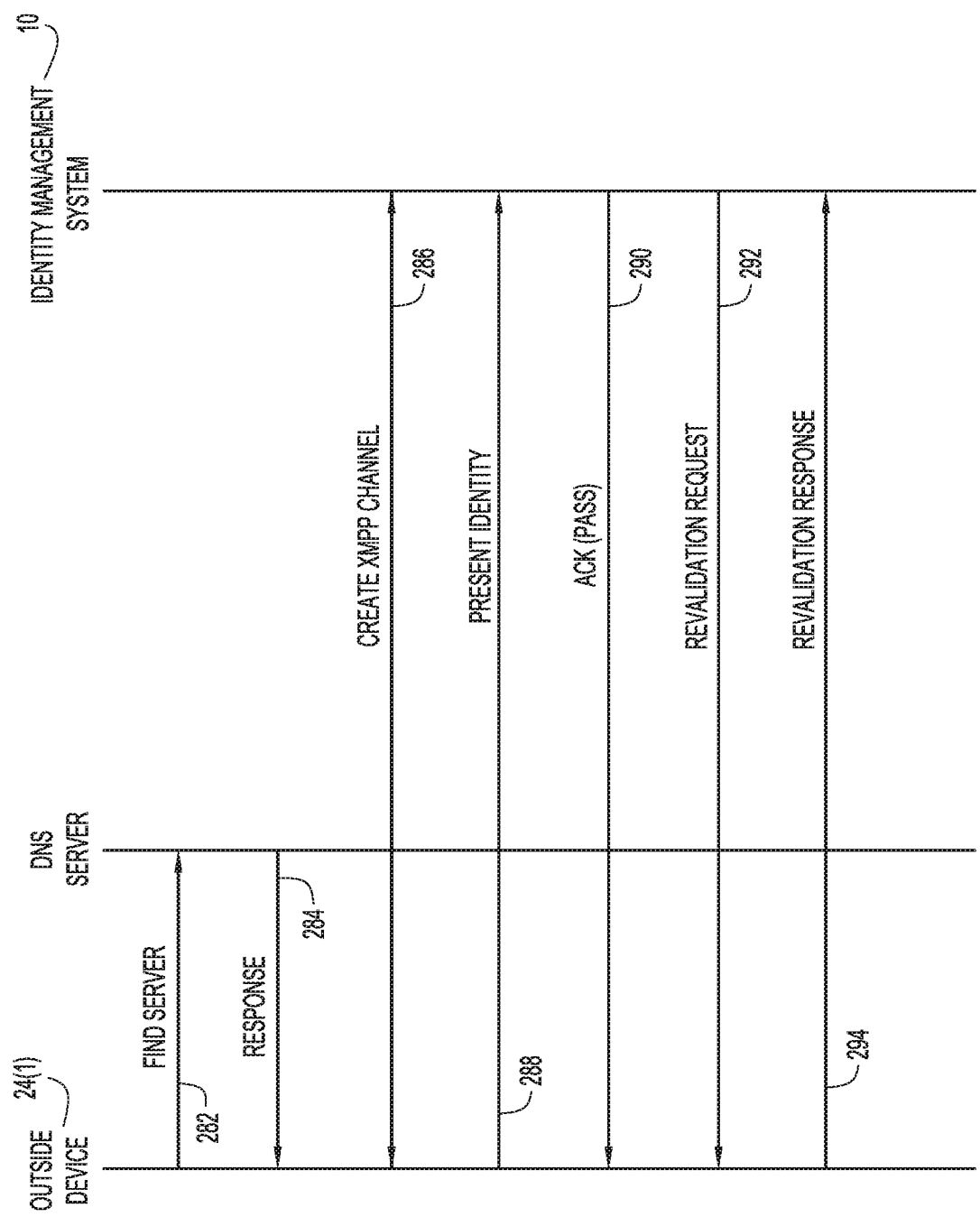
FIG. 4B is a ladder diagram illustrating messages exchanged during registration and validation of a device using an identity management system, according to an example embodiment.

FIG. 4B is a ladder diagram illustrating registration and validation of a device using an instant message and presence protocol for machine-to-machine interactions in accordance with examples presented herein. That is, FIG. 4B illustrates an example protocol exchange to automate the connection of a device to an identity management system. The illustrative protocol exchange of FIG. 4B begins with an outside device, such as outside device 24(1), sending a find server message 282 to a domain name server (DNS) (not shown in FIG. 1). The DNS responses with a find server response 284. Arrow 286 represents a bi-directional exchange between the outside device 24(1) and the identity management system 10 to create an instant message and presence protocol (e.g., XMPP) channel for direct communication with one another. After creation of the instant message and presence protocol channel, the created channel is used by the outside device 24(1) to send a message 288 in which the outside device 24(1) presents its identity to the identity management system 10. The identity management system 10 may then send an acknowledgement message 290 indicating that the outside device 24(1) has been registered with the identity management system 10. At a later time, the identity management system 10 may issue a revalidation request 292 to the outside device 24(1) using the instant message and presence protocol channel. Upon receiving the revalidation request 292, the outside device 24(1) uses the instant message and presence protocol channel to send a revalidation response 294 to the identity management system 10.

In accordance with examples presented herein, when an outside entity fails re-validation, the outside entity may be marked untrusted and removed from any active trust chains. That is, the trust links stored in databases 75, 80, and/or 85 are updated to indicate that the outside entity has failed validation, and that the entity's account is no longer trusted. This may trigger a removal of the entity from the trust chain. The marking of an outside entity's account as untrusted and/or the removal of an outside entity causes a "break" in any trust chains in which the outside user was participating. When a trust chain is broken, the trust chain is referred to as having two portions/parts, namely a trusted portion above the break (i.e., the portion with continuous trust links back to the local domain) and an orphaned portion below the break (i.e., the portion that no longer has continuous trust links back to the local domain). A feature of the techniques presented herein is that a trust chain may be re-formatted when a trust chain is broken by "re-parenting" the orphaned section of a trust chain (i.e., re-linking the orphaned portion of the trust chain to the local domain). FIGS. 6A-6D are diagrams illustrating re-parenting in accordance with examples presented herein.

Figure 6A:
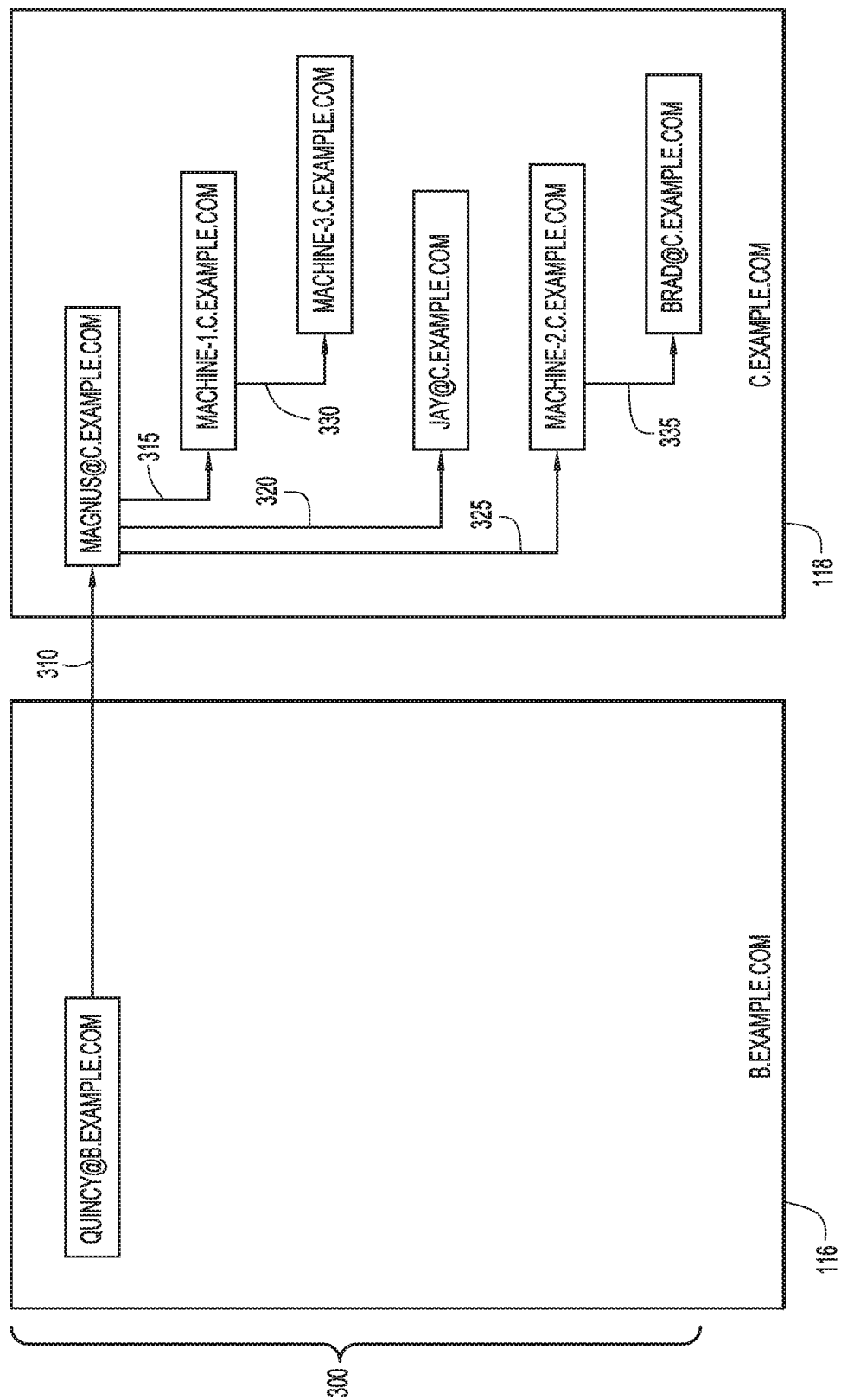

More specifically, FIG. 6A illustrates a trust chain 300 formed between Company B and Company C in accordance with examples presented herein. Trust chain 300 includes an individual trust link 310 formed between a first user at Company B (i.e., quincy@B.example.com) and a first outside entity at Company C, which in this example is a user (i.e., magnus@C.example.com). In this example, quincy@B.example.com has trusted and delegated trust authority to magnus@C.example.com, thereby allowing magnus@C.example.com to trust other entities in the remote domain 118. As shown, magnus@C.example.com has trusted three additional outside entities (i.e., machine-1.C.example.com, jay@C.example.com, and machine-2.C.example.com), thereby forming additional individual trust links 315, 320, and 325. Magnus@C.example.com has also delegated trust authority to machine-1.C.example.com and machine-2.C.example.com, but not to jay@C.example.com. As a result, machine-1.C.example.com trusts another entity at Company C (i.e., machine-3.C.example.com) and machine-2.C.example.com also trusts another entity at Company C (i.e., brad@C.example.com), thereby forming additional individual trust links 330 and 335, respectively. In the example of FIG. 6A, all of the outside entities magnus@C.example.com, machine-1.C.example.com, jay@C.example.com, machine-2.C.example.com, machine-3.C.example.com, and brad@C.example.com have been granted access to enterprise network 15 of Company B. The access of machine-1.C.example.com, jay@C.example.com, machine-2.C.example.com, machine-3.C.example.com, and brad@C.example.com has each been derived through the delegation authority of magnus@C.example.com. As such, FIG. 6A illustrates a cross-organization trust chain in which access has been delegated by one or more outside entities. A cross-organization trust chain in which access has been delegated by one or more outside entities is sometimes referred to herein as a delegated trust chain.

Figure 6B:
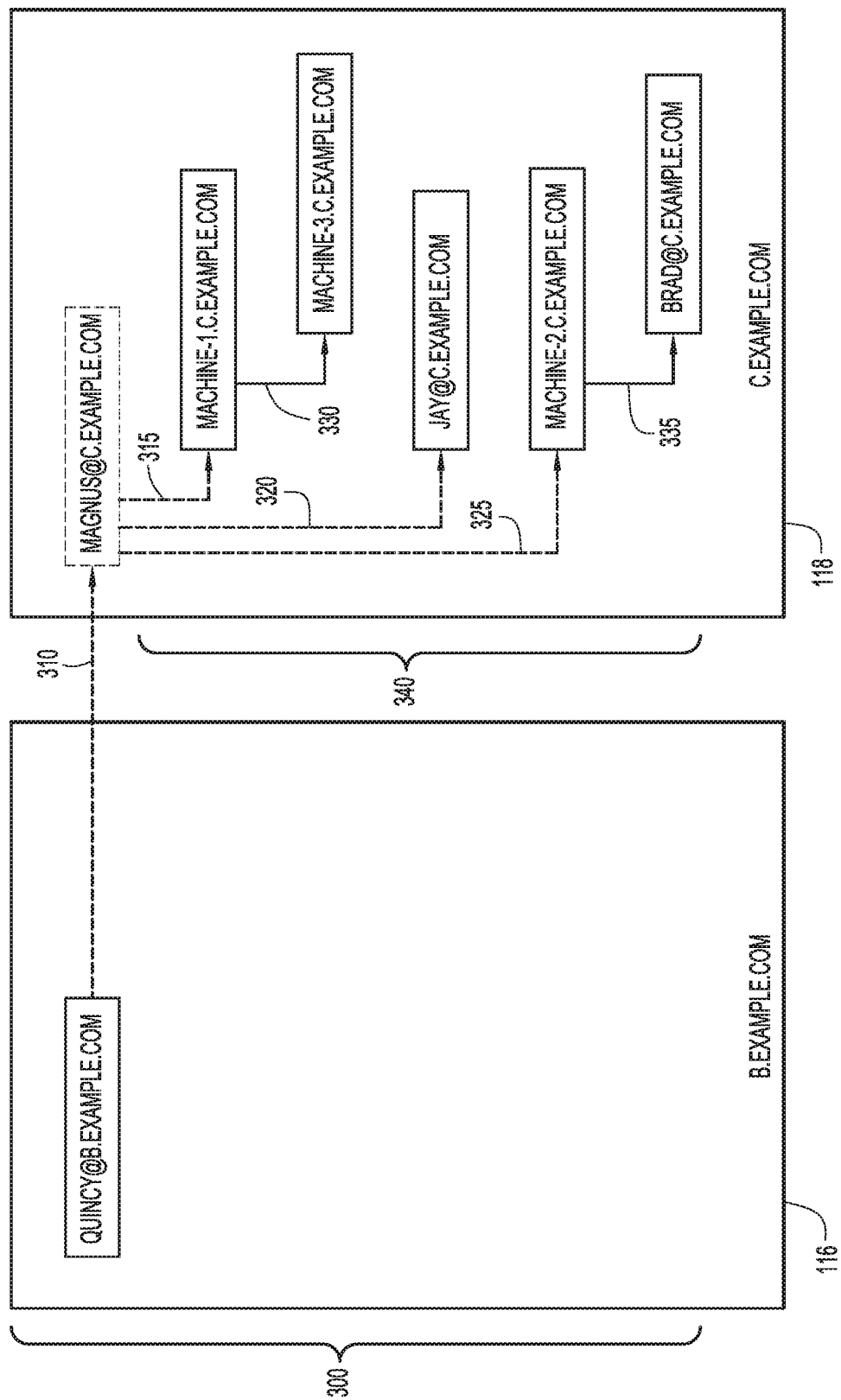

Referring next to FIG. 6B, it is shown that outside user magnus@C.example.com leaves Company C, which is identified, for example, through a re-validation failure as described above. As a result, individual trust links 310, 315, 320, and 325, which each included magnus@C.example.com on one end of the respective link are no longer valid and trust chain 300 is broken. Outside entities machine-1.C.example.com, jay@C.example.com, machine-2.C.example.com, machine-3.C.example.com, and brad@C.example.com, and the links there between, form an orphaned portion 340 of trust chain 300. Since machine-1.C.example.com, jay@C.example.com, and machine-2.C.example.com, are no longer directly or indirectly trusted by an entity at Company B, they no longer have access to enterprise network 15. Since magnus@C.example.com was not situated at either end of the individual trust links 330 and 335, those trust links remain valid. However, machine3@.com and brad@C.example.com are also no longer directly or indirectly trusted by an entity at Company B and also do not have access to enterprise network 15.

Alerting system 65 (FIG. 1) of the identity management system 10 may inform the outside entities machine-1.C.example.com, jay@C.example.com, machine-2.C.example.com, machine-3.C.example.com, and brad@C.example.com that their access to enterprise network 15 has been suspended. Similarly, alerting system 65 may inform quicy@B.example.com, or another entity at the local domain, that magnus@C.example.com has failed re-validation. Quincy@B.example.com may then initiate action to repair trust chain 300. To repair trust chain 300, quicy@B.example.com may, for example, add a new trust link to bridge/span the break in the chain (e.g., directly trust machine-1.C.example.com, jay@C.example.com, and/or machine-2.C.example.com). Alternatively, to repair trust chain 300, quicy@B.example.com may insert one or more outside entities into the trust chain to fill in the break. In the example of FIG. 6C, quicy@B.example.com trusts another outside device of Company C (i.e., machine-4.C.example.com) and grants machine-4.C.example.com delegated trust authority, thereby allowing machine-4.C.example.com to trust other entities in the remote domain 118. In other words, an individual trust link 311 is formed between a first entity at Company B (i.e., quincy@B.example.com) and a new outside entity at Company C (i.e., machine-4.C.example.com).

Figure 6D:
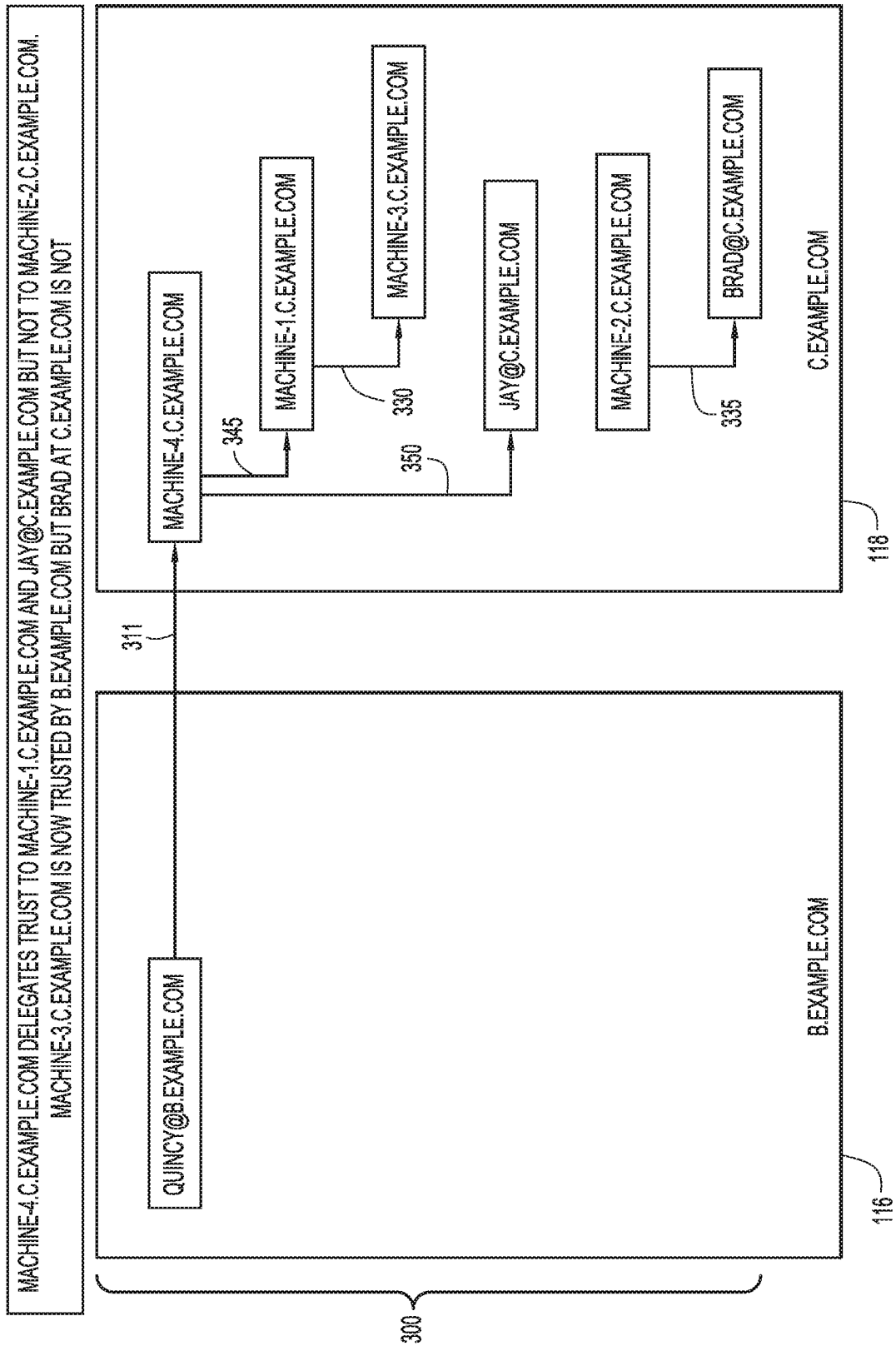

As shown in FIG. 6D, machine-4.C.example.com trusts machine-1.C.example.com and jay@C.example.com so as to form trust links 345 and 350 that re-link machine-1.C.example.com and jay@C.example.com, respectively, with the local domain 116. Once machine-1.C.example.com is re-linked to the local domain 116 through machine-4.C.example.com, individual trust link 330 is re-activated and machine-3.C.example.com is also re-granted access to enterprise network 15. As shown in FIG. 6D, machine-4.C.example.com does not trust machine-2.C.example.com. As such, machine-2.C.example.com and brad@C.example.com remain orphaned and cannot access enterprise network 15.

Figure 7:
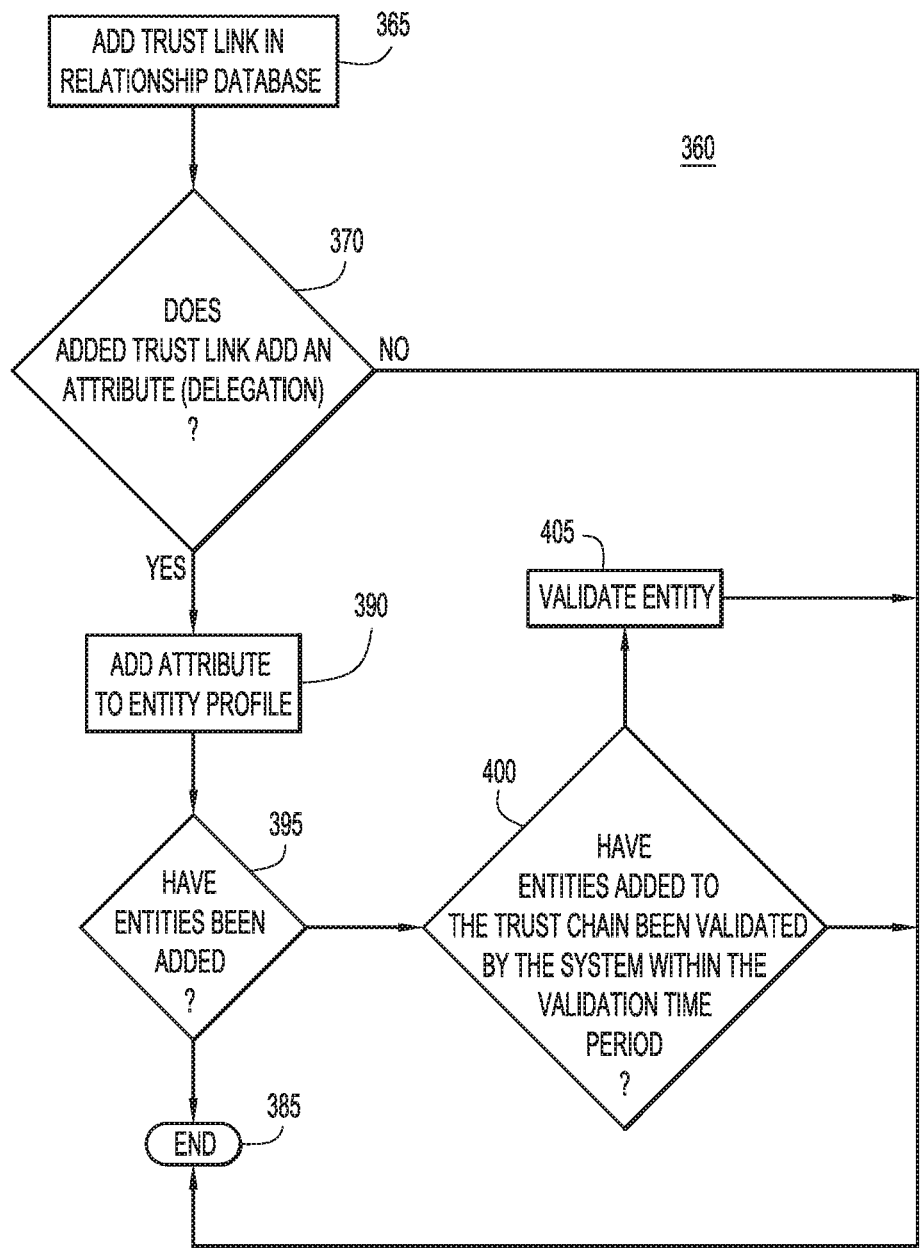
FIG. 7 is a flowchart illustrating a method for re-parenting a portion of a trust chain, according to an example embodiment.

FIG. 7 is a flowchart of a method 360 for re-parenting an orphaned portion of a trust chain in accordance with examples presented herein. Method 360 begins at 365 where a new trust link is added to the relationship database 80 (FIG. 1). The added trust link may be, for example, a new individual trust link between two entities that are part of an existing trust chain that is selected to bridge a break in the trust chain. Alternatively, the added trust link may be a trust link between one or more newly added entities (i.e., entities previously not part of the trust chain) to an entity in the existing trust chain. At 370, a determination is made as to whether the added trust link also adds an attribute (e.g., is an added entity associated with the Delegate Trust attribute). If an attribute is not added, then it is determined that any downstream entities (i.e., outside entities in the orphaned portion) and any upstream entities (i.e., entities in the trusted portion) are unchanged. As such, the method then ends at 385.

Returning to 370, if it is determined than an attribute is added (e.g., delegation of trust), then at 390 the corresponding entity profile is updated with the attribute. At 395, it is determined whether any entities have been added (due to repairing the linkage in the trust chain). If not, then the method ends at 385. If it is determined that an entity has been added, (or their trust chain has been restored), then it is determined that all downstream entities are authenticable. The method 360 then proceeds to 400 where it is determined whether or not entities added to the trust chain (either new entities or restored entities) have been validated by the system in accordance with the selected validation settings. If not, the entity is revalidated at 405 and, since the upstream entities remain unchanged, the method ends at 385. If it is determined at 400 that the entity has been validated in accordance with the selected validation settings, then the method ends at 385 since upstream entities also remain unchanged.

In summary of FIGS. 6A-6D and FIG. 7, re-parenting provides a mechanism to repair a trust chain that is broken when an outside entity is removed. In general, if trust is broken anywhere along the chain, the trust at a specific link in the chain can be rebuilt. If a trust chain is rebuilt using an entity associated with the Trust and Delegation of Trust attributes, then the entire trust chain may be repaired. If a trust chain is rebuilt using an entity having only the Trust attribute, then a portion of the chain beyond the added trusted user remains orphaned. However, additional entities or new trust linkages may be added at any time to restore any orphaned trust chain.

Figure 8A:
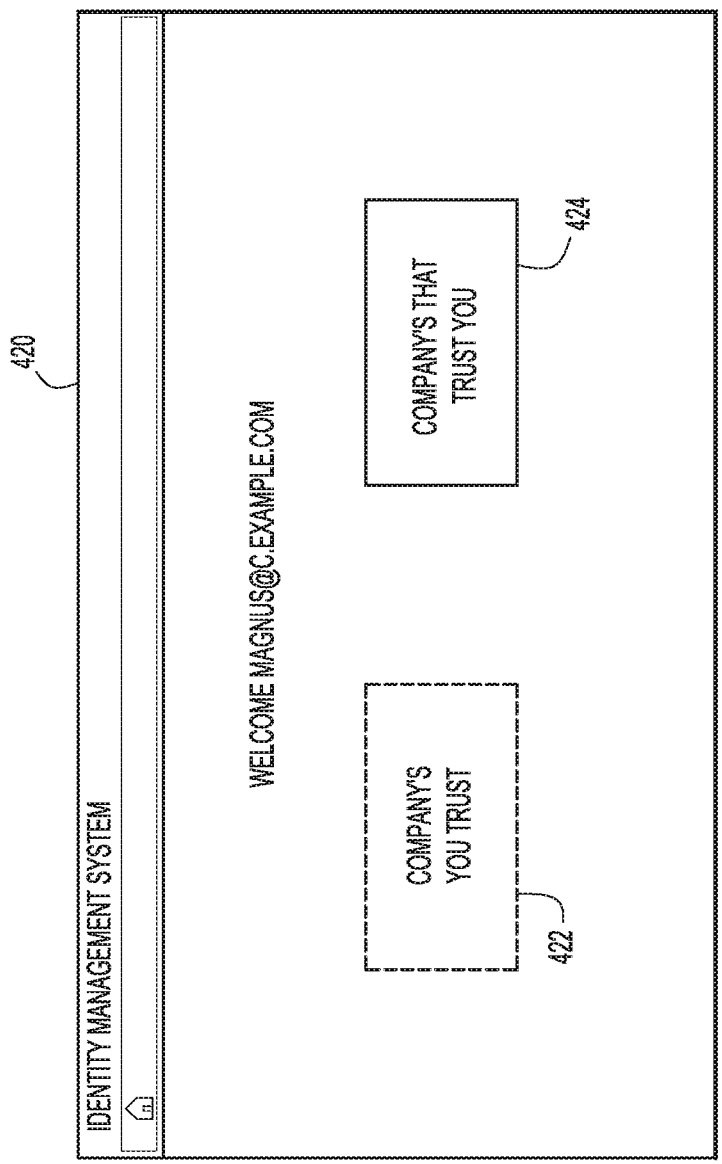
FIGS. 8A-8C are diagrams illustrating user interfaces that are provided to a user that receives a trust assignment, according to an example embodiment.
Figure 8B:
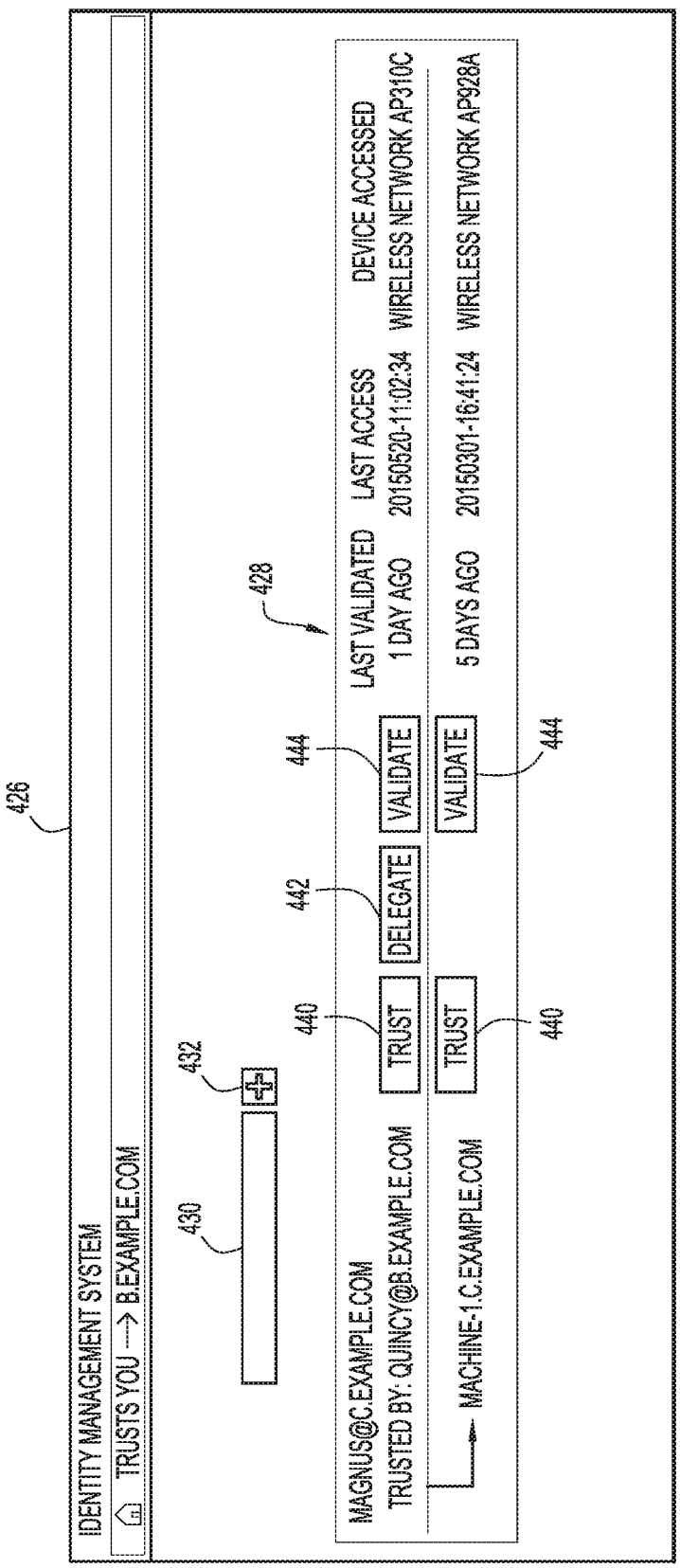
Figure 8C:
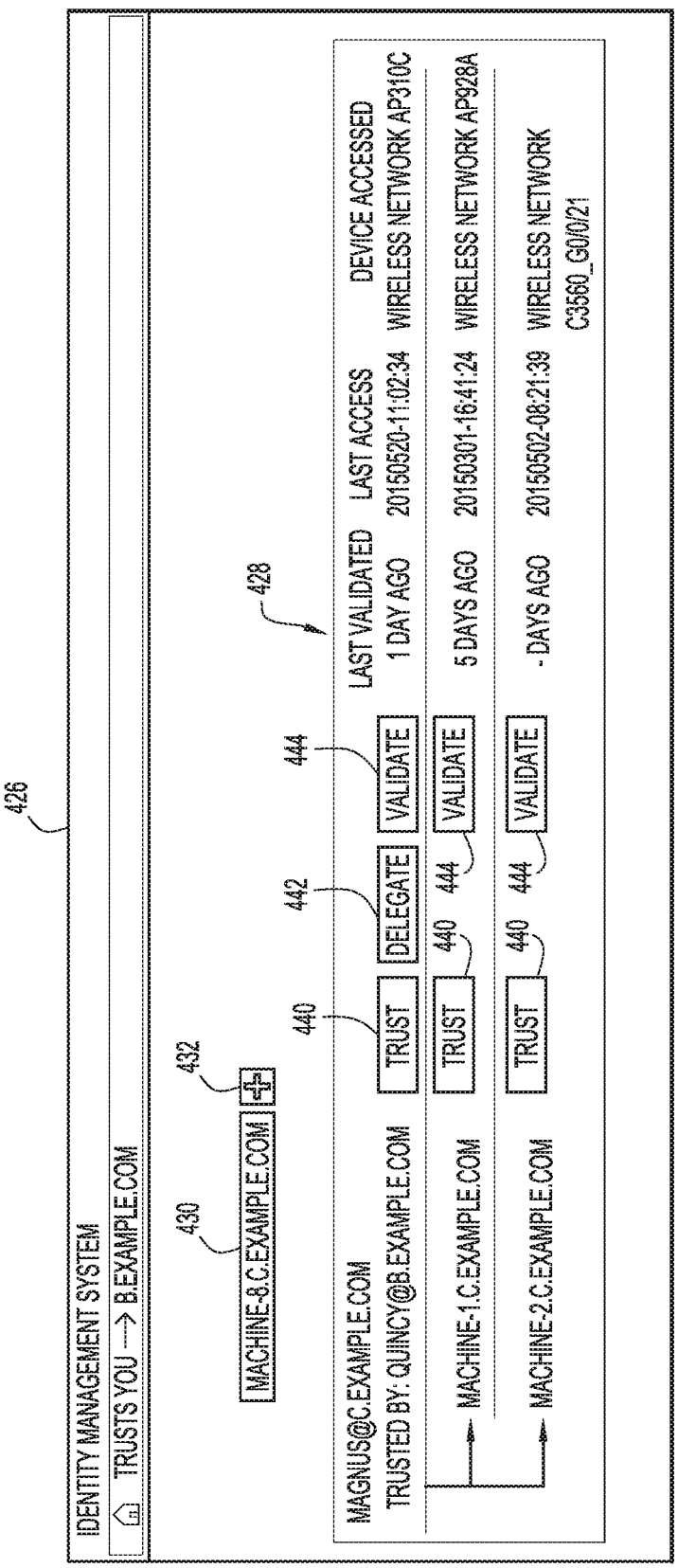

As noted above, entities are registered with the identity management system 10. After registration, entities can either receive trust attributes or both receive a trust attribute and an attribute to delegate trust. In other words, there are two types of entities, namely entities receiving trust and those which are not only trusted, but have been given the ability to delegate trust to other entities. Also as noted above, the identity management system 10 provides a web portal 60 (FIG. 1) that enables user (human) interaction with the identity management system. In practice, the web portal 60 enables the display of user interfaces (UIs) at one or more endpoint devices, and users access the identity management system through these user interfaces. FIGS. 8A-8C and 9A-9F are a first and a series of diagrams, respectively, illustrating user interfaces that may be provided to a user via the web portal 60. In particular, FIGS. 8A-8C illustrate user interfaces that are provided to a user that receives a trust assignment, while FIGS. 9A-9F are user interfaces that are provided to a user that allocates trust. It is to be appreciated that the user interfaces shown in FIGS. 8A-8C and FIGS. 9A-9F are merely illustrative.

More specifically, referring first to FIG. 8A, a user interface 420 provided to a user (i.e., magnus@C.example.com) that is receiving a trust assignment is illustrated. As shown, when magnus@C.example.com first logs into his user profile, he sees two icons: (1) a "Company's You Trust" icon 422 (i.e., organizations having users that magnus@C.example.com can trust); and (2) a "Company's That Trust You" icon 424 (i.e., companies that can trust magnus@C.example.com). In the example of FIG. 8A, magnus@C.example.com doesn't have the authority to allocate trust outside of Company C, so icon 422 is not selectable, as indicated by the dashed lines. By selecting icon 424, magnus@C.example.com now view the trust assignment's allocated to him.

FIG. 8B illustrates a user interface 426 that may be provided to magnus@C.example.com after selecting icon 424, and then choosing a specific company from a list of companies which trust magnus@C.example.com. As shown in FIG. 8B, in the displayed hierarchy 428, magnus@C.example.com is associated with three display icons, namely a trust icon 440, a delegate icon 442, and a validate icon 444. Display of trust icon 440 indicates that magnus@C.example.com has a validated trust (i.e., has been trusted and has completed a validation process as described above). Display of the delegate icon 442 indicates that magnus@C.example.com has been allocated the ability to delegate trust (i.e., magnus@C.example.com can allocate trust assignments to other users of Company C). The validate icon 444, when selected, allows magnus@C.example.com to re-validate his account with the identity management system 10. FIG. 8B illustrates that magnus@C.example.com is trusted by quincy@B.example.com to access enterprise network 15 of Company B. Additionally, since magnus@C.example.com leads a team at Company C, quincy@B.example.com has also delegated trust to magnus@C.example.com. Thus, magnus@C.example.com has the authority to allocate trust to other users within Company C.

In the example of FIG. 8B, magnus@C.example.com has previously delegated trust to machine-1.C.example.com, as shown in the displayed hierarchy 428. Magnus@C.example.com has also allocated delegate trust authority to machine-1.C.example.com, and as such, machine-1.C.example.com is able to allocate trust to other entities within Company C.

Magnus@C.example.com may also wish to allocate trust to additional entities, such as machine-2.C.example.com. As such, magnus@C.example.com searches for machine-2.C.example.com in search field 430 and adds machine-2.C.example.com to the trust chain by selecting the add entity icon 432. In the example of FIG. 8C, machine-2.C.example.com is already registered with the identity management system 10 (i.e., has an associated identity management system account) and, as such, machine-2.C.example.com is automatically added to the hierarchy 428.

More specifically, FIG. 8C illustrates an updated displayed hierarchy 428 that also includes machine-2.C.example.com. The identity management system 10 also initiates validation of machine-2.C.example.com to confirm that the device is owned by Company C. As noted above, identity management system 10 may validate machine-2.C.example.com using one or more validation techniques described above. Until machine-2.C.example.com is validated by the identity management system 10, the trust icon 440 remains greyed out, as indicated by the dashed lines, indicating that machine-2.C.example.com still cannot access the enterprise network 15. Magnus@C.example.com has also allocated delegate trust authority to machine-2.C.example.com, and as such, machine-2.C.example.com is able to allocate trust to other entities within Company C.

As noted above, FIG. 8C illustrates an example in which magnus@c.example.com adds machine-2.C.example.com to the hierarchy 428 using the search field 430 and add entity icon 432. In this example, machine-2.C.example.com is already registered with the identity management system 10. In other examples, magnus@C.example.com may attempt to add an outside device that has not been previously registered with the identity management system 10.

In one such example, magnus@C.example.com uses search field 430 to search an outside device identified as "machine-8.C.example.com." However, the search returns no results, indicating that machine-8.C.example.com does not exist in the cloud identity database(s) (i.e., machine-8.C.example.com has not registered with the identity management system 10 and does not have an identity management system account). As such, the identity management system 10 instates a process to register machine-8.C.example.com. In one specific example, the identity management system 10 uses DNS SRV records for XMPP to initiate an IM and presence towards machine8@C.example.com.

More specifically, since hine-8.C.example.com does not exist in the identity management system 10, an XMPP membership request is generated and sent to a machine/device address associated with hine-8.C.example.com. The membership request is a query to validate that machine8 is part of C.example.com. Machine8@C.example.com receives the membership request and sends a membership response back to the identity management system 10. The membership response is then analyzed by the identity management system 10.

As noted, the techniques presented herein are not limited to the use of XMPP. However, to facilitate understanding of the presented techniques, an illustrative use of XMPP is provided below. When using XMPP, the identity management system 10 communicates with devices using standard-based XMPP Extension (XEP)-0323 to ensure interoperability of registration, capability negotiation, and even Jingle, with all devices (i.e., from different vendors, etc.). In XMPP, security and scaling are built in and can be bundled together in the techniques presented herein for registration of new devices.

For example, a pseudo-code example in which an XMPP roster get can obtain a list of delegates is shown as:

```
C: <iq from='Lab_Computer@example.com/Client'
       id='unique'
       type='get'>
    <query xmlns='jabber:iq:roster'/>
   </iq>.
```

A pseudo-code example of an XMPP response is shown as:

```
S: <iq id='unique'
       to='Lab_Computer@example.com/Server'
       type='result'>
    <query xmlns='jabber:iq:roster' ver='ver7'>
      <item jid=hine-8@C.example.com/>
      <item jid=hie-9@C.example.com/>
    </query>
   </iq>
```

Therefore, in summary, an XMPP listing of the roster is the API into the device trust delegation. The identity management system can also register the presence from the devices it tracks, to get direct updates. A pseudo-code example of this process is shown as:

```
CS: <presence from='machine8@C.example.com'
              id='machine8'
              to='cloud@c.example.com'
              type='subscribed'/>
```

One aspect of the techniques presented herein is the automatic creation of a Jabber ID used for XMPP. At a high level, this is a unique identifier (i.e., machine8) and an associated domain (e.g., c.example.com).

Additionally, there are generally two main deployment models, both of which are enabled by the techniques presented herein. The first deployment model creates a subdomain, where trust is delegated by the company, for all things. For example, if the company is "C.example.com," then the sub-domain can be "things.example.com." In this method, the whole user space is free for any use (e.g., machine8@things.C.example.com). The second deployment model partitions the user part, which is under control of the company. For the company with "C.example.com," a thing can be "machine.8@C.example.com," provided the company can ensure that there will be no other "machine8" allowed. For this, a proposed approach is to preface the space hierarchically, like "Robot_XYZ", where XYZ can be 'Robot_ABC', and where ABC is a unique identifier for robot devices within "things" within company C. In this case, the construction of the identity yields Things.Robot.123.C.example.com.

Another aspect of the examples presented herein is the ability to leverage partitions to perform bulk trusts of a number of devices at the same time. In other words, a plurality of devices may be related based on one more attributes (e.g., name, domain/subdomain, device type, location, meaningful or opaque presence tags/labels, etc.). Using appropriate attribute relationships, the techniques presented herein may trust all related devices using a "bulk" transaction. For example, trust all photocopiers, light fixtures, etc. within a selected domain (e.g., identified through a selected naming convention) could be "trusted" (i.e., added to a trust chain) in one transaction.

Figure 9A:
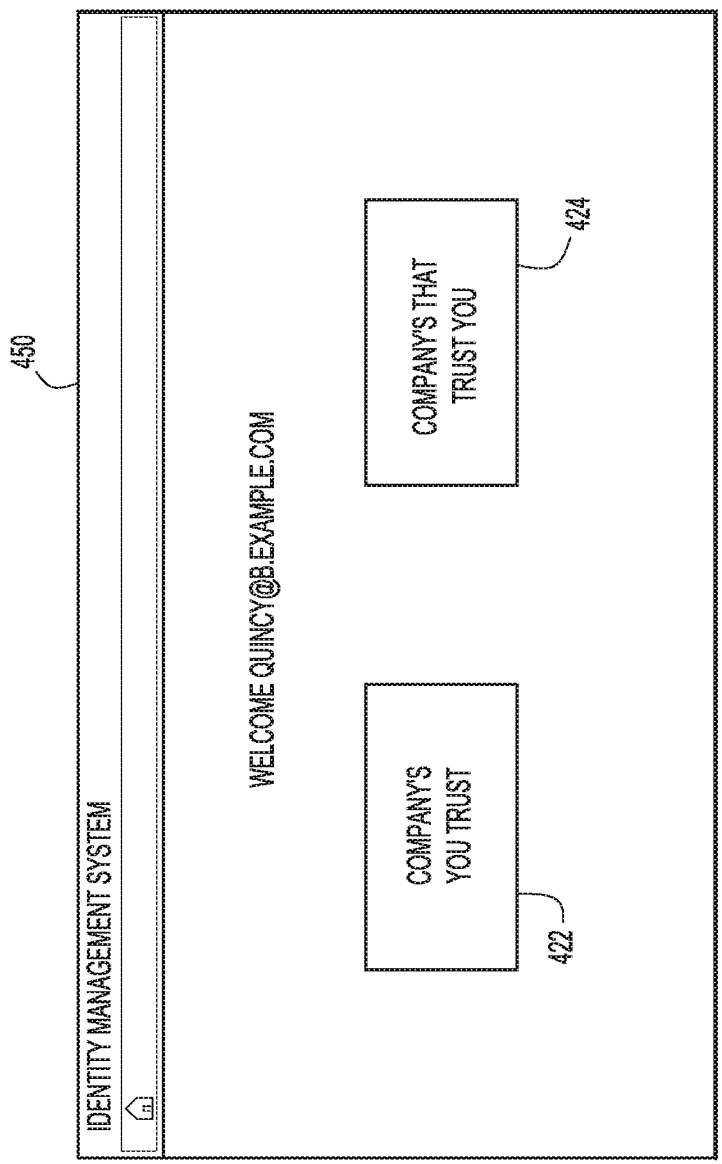
FIGS. 9A-9F are diagrams illustrating user interfaces that are provided to a user that allocates trust assignments, according to an example embodiment.

Referring next to the example of FIGS. 9A-9F, FIG. 9A illustrates a user interface 450 that is provided to a user (i.e., quincy@B.example.com) that is allocating trust assignments. Similar to user interface 420, the user interface 450 includes the Company's You Trust icon 422 and the Company's That Trust You icon 424. In the example of FIG. 9A, Company B both trusts other companies and receives trust from other companies. As such, both icons 422 and 424 are selectable.

Figure 9B:
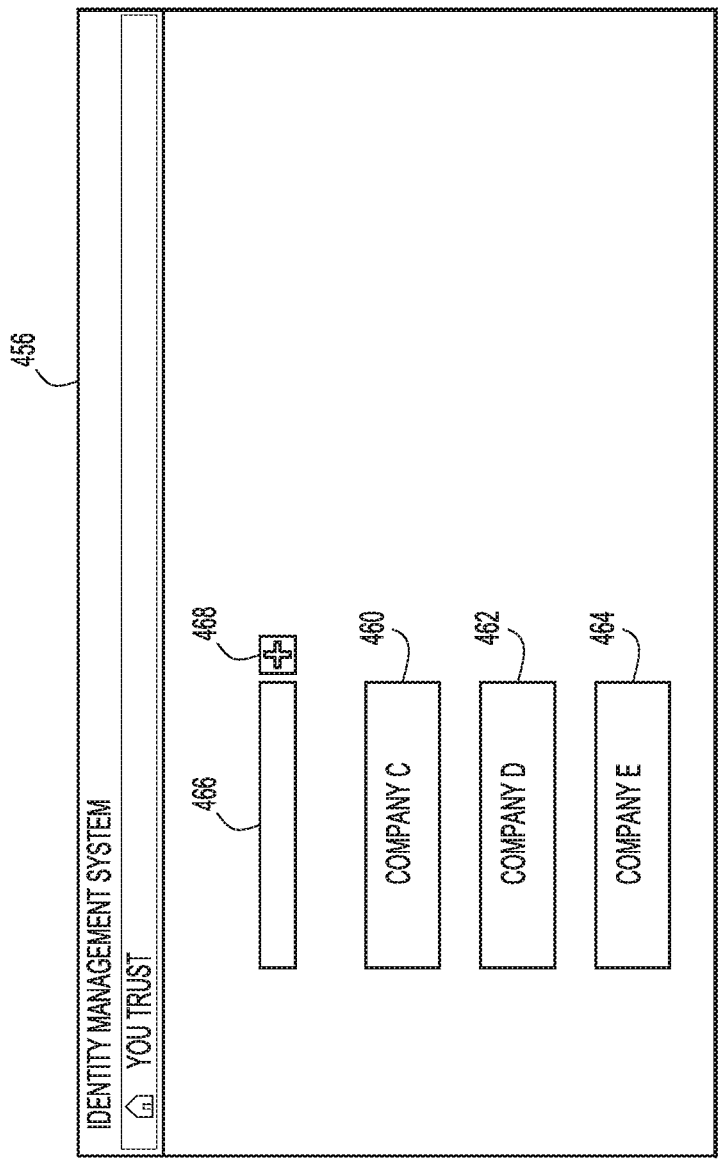

FIG. 9B illustrates a user interface 456 that may be provided to quincy@B.example.com when he selects icon 422 to display all of the companies that Company B trusts. In the example of FIG. 9B, Company B trusts Company C, Company D, and Company E that each have an associated selectable icon 460, 462, and 464, respectively. Also included in user interface 456 is a search field 466 and an (add company) icon 468 which allows a user to add another company to trust. This method creates the initial company to company linkage in the relationship database 80.

Figure 9C:
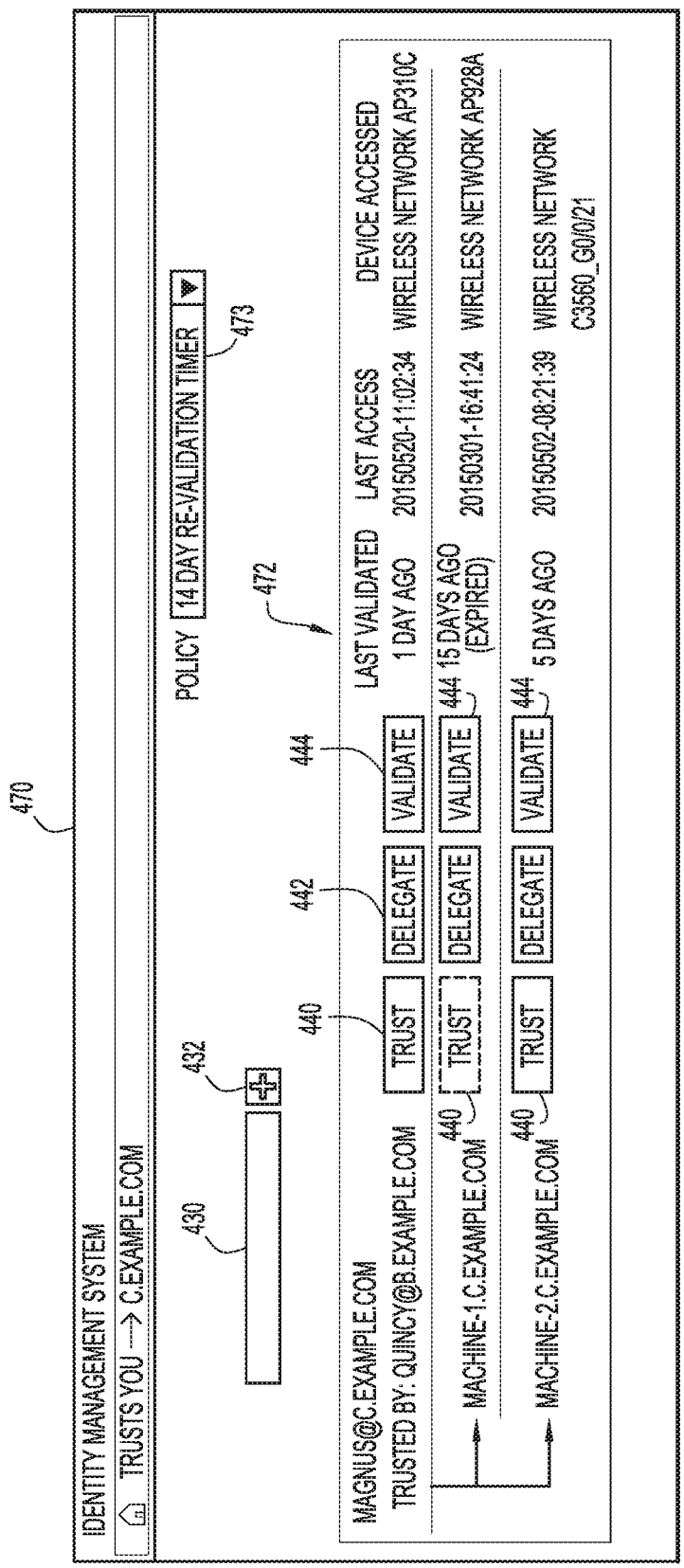

By clicking on icon 460 associated with Company C, a user interface 470 is displayed (FIG. 9C). User interface 470 includes a displayed hierarchy 472 that is similar to hierarchy 428 (FIG. 8B). Hierarchy 472 illustrates that magnus@C.example.com was allocated trust and delegation of trust, and that magnus@C.example.com has also delegated trust to machine-1.C.example.com and machine-2.C.example.com. In accordance with the techniques presented herein, quincy@B.example.com does not have to independently allocate trust to machine-1.C.example.com and machine-2.C.example.com. Instead, once trust and delegation was allocated to magnus@C.example.com, the remaining hierarchy is built by magnus@C.example.com. As such, quincy@B.example.com only needs to monitor and revoke trust as necessary.

FIG. 9C also includes a policy field 473 indicating the validation policy dictated by Company B. As shown, policy field 473 indicates that an entity must be re-validated every 14 days. In the example of FIG. 9C, machine-1.C.example.com has not been validated by the identity management system for 15 days. Since the re-validate policy is set to 14 days, machine-1.C.example.com is no longer trusted, indicated by dashed trust icon 440 in hierarchy 472. As a result, machine-1.C.example.com cannot access the enterprise network 15 until undergoing re-validation, as described above.

Figure 9D:
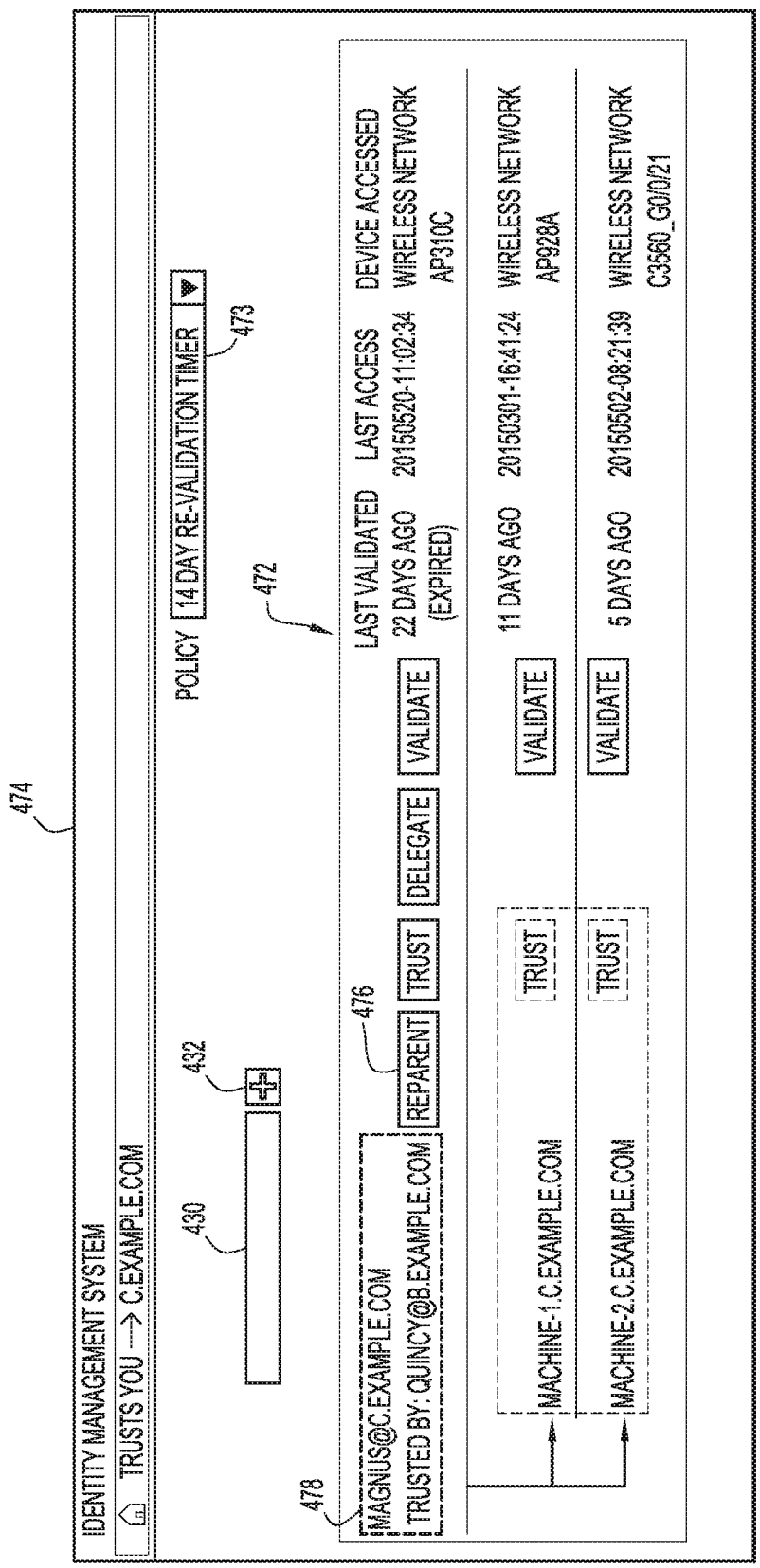

As noted above, a feature of the techniques presented herein is the ability to re-parent orphaned portions of a trust chain. FIG. 9D illustrates a user interface 474 that may be displayed to quincy@B.example.com when magnus@C.example.com is no longer trusted (i.e., has failed a re-validation). This immediately causes the entire hierarchy under magnus@C.example.com to be untrusted as well (i.e., machine-1.C.example.com and machine-2.C.example.com are no longer trusted).

Figure 9E:
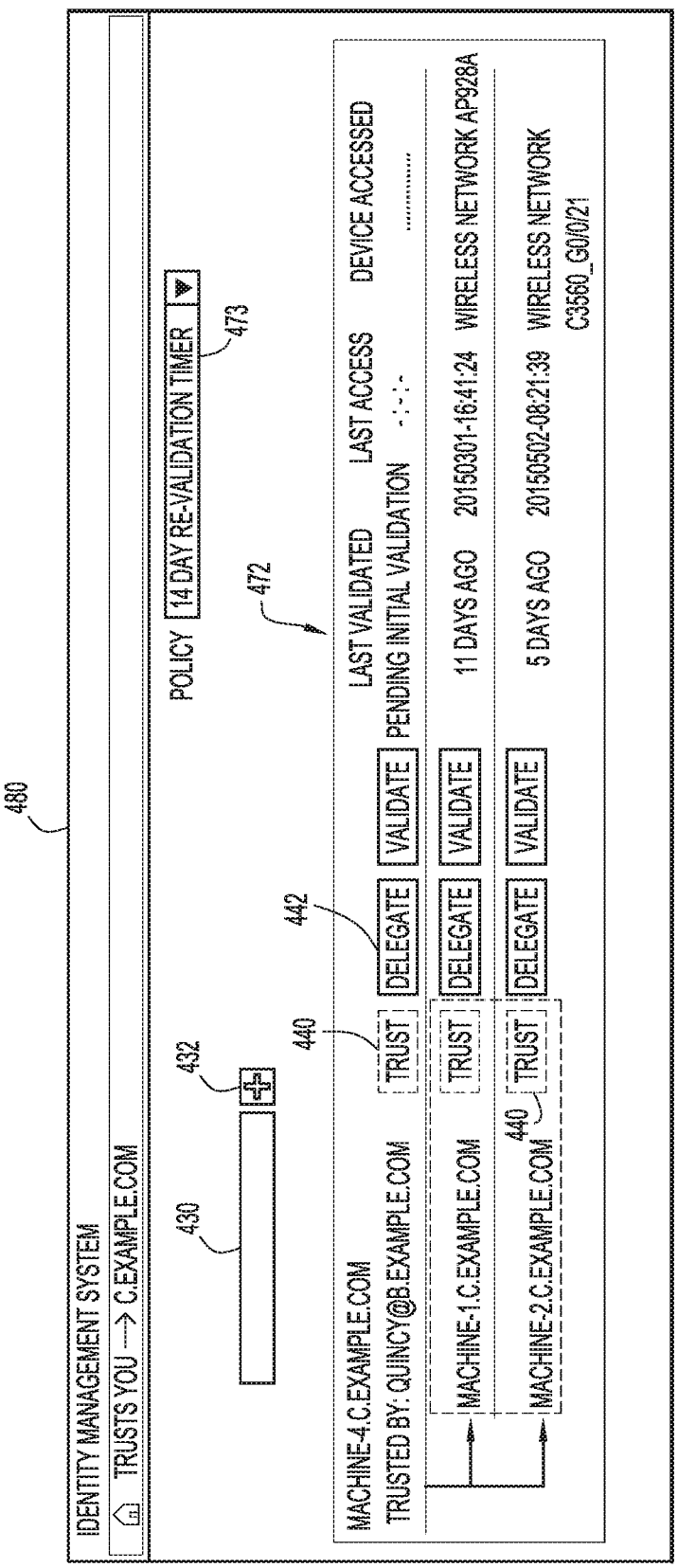
Figure 9F:
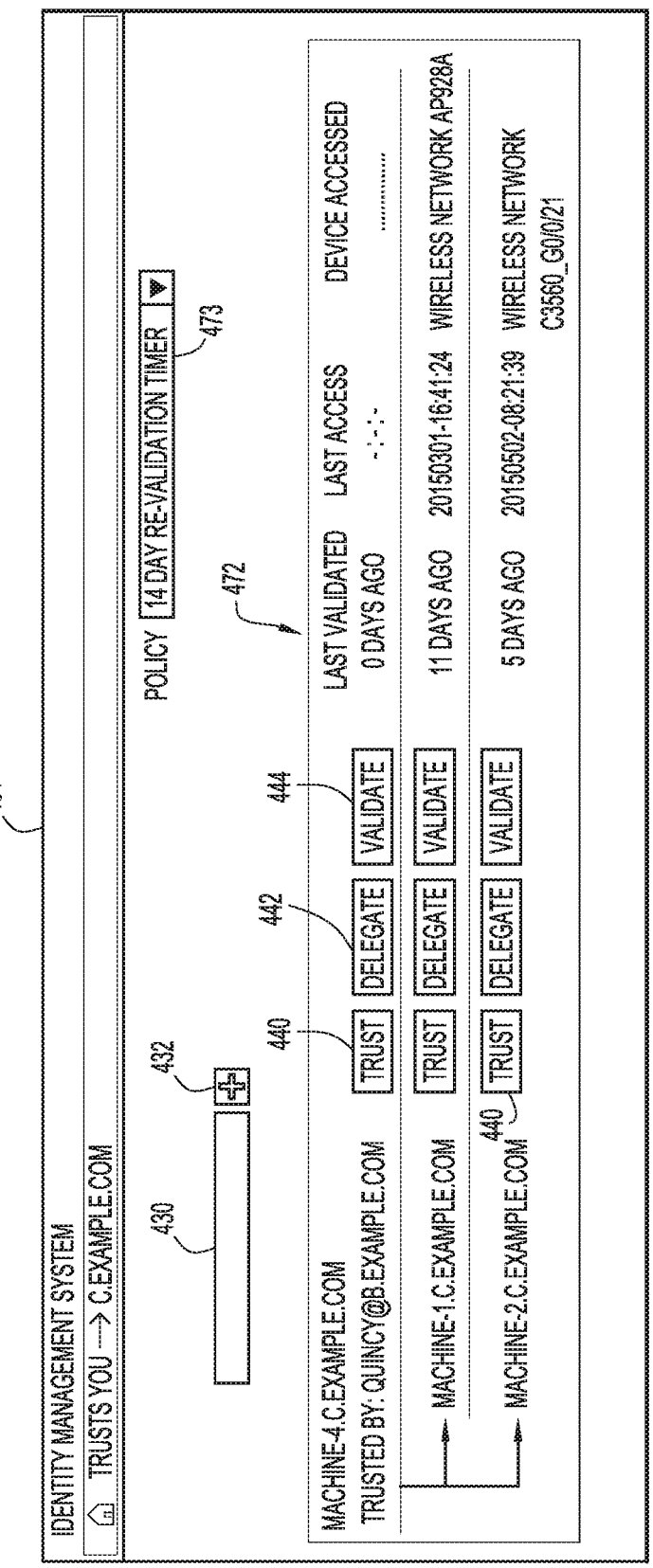

As shown, when magnus@C.example.com fails validation, the identity management system 10 is configured to display a reparent icon 476 adjacent to a greyed box 478 (as indicated by the dashed lines) indicating that magnus@C.example.com is no longer trusted. By clicking the reparent icon 476, magnus@C.example.com may be replaced by one or more other entities. FIG. 9E is a user interface 480 indicating that magnus@C.example.com has been replaced by machine-4.C.example.com. Once machine-4.C.example.com is added, the account of machine-4.C.example.com must be validated before the trust hierarchy is reestablished. Until machine-4.C.example.com completes the validation, machine-4.C.example.com, machine-1.C.example.com, and machine-2.C.example.com all remain untrusted, as indicated by dashed trust icons 440. However, as shown in user interface 484 of FIG. 9F, once the account of machine-4.C.example.com has been validated, the trust hierarchy is rebuilt and machine-4.C.example.com, machine-1.C.example.com, and machine-2.C.example.com can each access enterprise network 15.

As shown in FIGS. 8A-8C and FIGS. 9A-9F, user access is tracked and reported in the web portal 60 for display to the users.

Figure 10:
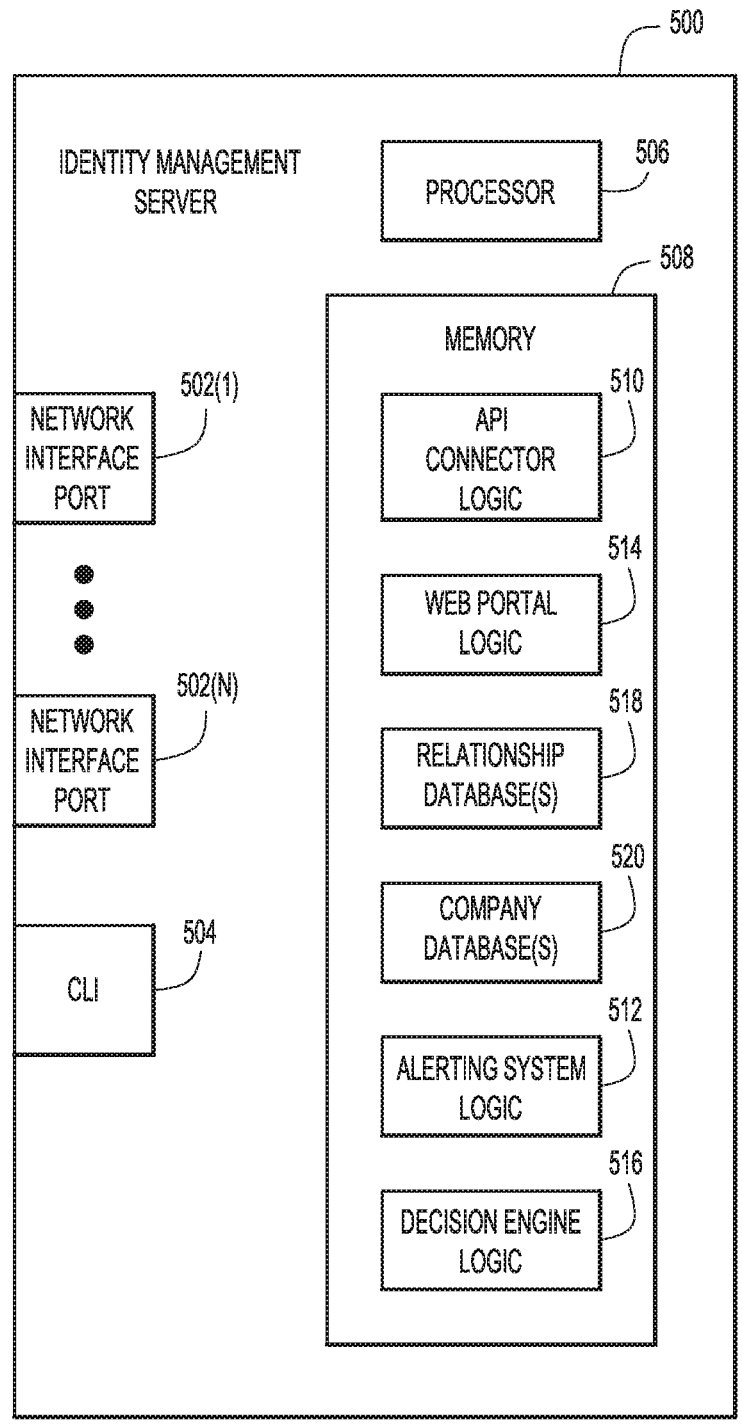
FIG. 10 is a block diagram of an identity management server, according to an example embodiment.

FIG. 10 is a block diagram of an identity management server 500 representing an identity management system in accordance with examples presented herein. Merely for ease of illustration, FIG. 10 illustrates an identity management system as a single server 500. However, it is to be appreciated that, in practice, an identity management system in accordance with examples presented herein may be formed by a plurality of servers and/or other devices (i.e., networking elements, computers, etc.). As such, the example arrangement of FIG. 10 is merely illustrative of one example implementation.

As shown, 502(1)-502(N) comprises a plurality of network interface ports 502(1)-502(N), a command-line interface (CLI) 504, a processor 506, and a memory 508. Memory 508 comprises API connector logic 510, alerting system logic 512, web portal logic 514, decision engine logic 516, one or more per-company relationship databases 518, and a plurality of company databases 520.

The network interface ports 502(1)-502(N) provide network communications between the identity management server 500 and one or more of the network components. Network interface ports 502(1)-502(N) may be, for example, Ethernet ports of a network interface card (NIC) implemented in one or more application-specific integrated circuits (ASICs). The CLI 504 is a mechanism by which commands can be delivered to the identity management server 500 in the form of successive lines of text (command lines).

The memory 508 may be read only memory (ROM), random access memory (RAM), magnetic disk storage media devices, optical storage media devices, flash memory devices, electrical, optical, or other physical/tangible memory storage devices. Thus, in general, the memory 508 may comprise one or more tangible (non-transitory) computer readable storage media (e.g., a memory device) encoded with software comprising computer executable instructions and when the software is executed (by the processor 506) it is operable to perform the operations described herein. In particular, the identity management server 500 performs the operations described above in connection with FIGS. 1-9F when executing the software (i.e., API connector logic 510, alerting system logic 512, web portal logic 514, and decision engine logic 516) stored in memory 508.

FIG. 11 is a flowchart of a method 550 in accordance with examples presented herein. Method 550 begins at 555 where data representing a trust chain formed between a local domain and the remote domain is storing, in an identity management system. The local domain has an associated secure enterprise computing network the trust chain identifies one or more outside entities associated with the remote domain that are authorized to access the secure enterprise computing network. At 560, the identity management system receives a request for access to the secure enterprise computing network by a first outside entity of the one or more outside entities associated with the remote domain. At 565, access by the outside entity to the secure enterprise computing network is controlled based on an analysis of the trust chain.

In general, the techniques presented herein present a solution for a cloud-based management of outside access to an enterprise network for various entities, including users and devices. That is, the techniques proposes a machine-to-machine and human-to-machine delegated identity management (cloud-based) service that creates trust chains by both trusting entities at partner companies and facilitating the delegation of trust to outside entities. An aspect of the techniques presented herein is that a person can delegate trust to a device, and a device can delegate trust to another device. This, in turn, builds chains of trust, which include machines and people.

The cloud service performs periodic validation of entities using, for example, machine-to-machine communication (e.g., XMPP, SIP, SMS, etc.) and removes trust for entities that fail validation. Chains of trust (once broken) can be easily re-built through re-parenting. The techniques presented herein provide a mechanism for leveraging a cloud service to provide multi-party mutual authentication services to a company through both a trust and delegation model, along with entity validation. This significantly reduces the load of companies having to add outside entities into their AAA systems for partner companies This techniques presented herein provide an automated solution to identity management as a service for devices. As noted, the techniques leverage a chain of trust, supporting an as-a-service cloud-based identity service, which intertwines devices and people.

Thus, in one form, a method is provided comprising: storing, in an identity management system, data representing a trust chain formed between a local domain and a remote domain, wherein the local domain has an associated secure enterprise computing network and wherein the trust chain identifies one or more outside entities associated with the remote domain that are authorized to access the secure enterprise computing network; receiving, at the identity management system, a request for access to the secure enterprise computing network by a first outside entity of the one or more outside entities associated with the remote domain; and controlling access by the outside entity to the secure enterprise computing network based on an analysis of the trust chain.

In another form, a cloud-based identity management system is provided comprising: memory; one or more network interfaces; and at least one processor configured to: store data representing a trust chain formed between a local domain and a remote domain, wherein the local domain has an associated secure enterprise computing network and wherein the trust chain identifies one or more outside entities associated with the remote domain that are authorized to access the secure enterprise computing network, receive, at the identity management system, a request for access to the secure enterprise computing network by a first outside entity of the one or more outside entities associated with the remote domain, and control access by the outside entity to the secure enterprise computing network based on an analysis of the trust chain.

In still another form, a non-transitory computer readable storage media is provided encoded with instructions that, when executed by a processor of a network device, cause the processor to: store, in an identity management system, data representing a trust chain formed between a local domain and a remote domain, wherein the local domain has an associated secure enterprise computing network and wherein the trust chain identifies one or more outside entities associated with the remote domain that are authorized to access the secure enterprise computing network; receive, at the identity management system, a request for access to the secure enterprise computing network by a first outside entity of the one or more outside entities associated with the remote domain; and control access by the outside entity to the secure enterprise computing network based on an analysis of the trust chain.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method, comprising:
   storing, in an identity management system, data representing a trust chain formed between a local domain and a remote domain, wherein the local domain has an associated secure enterprise computing network, and wherein the trust chain identifies one or more outside entities associated with the remote domain that are authorized to access the secure enterprise computing network;
   granting a delegation authority to a parent entity among the one or more outside entities associated with the remote domain, wherein the delegation authority enables the parent entity to add outside entities to the trust chain as child entities;
   storing, in the identity management system, data indicating that the parent entity has been granted the delegation authority to add child entities so that the child entities associated with the remote domain can access the secure enterprise computing network of the local domain;
   receiving, at the identity management system, a request for access to the secure enterprise computing network by one of the child entities associated with the remote domain;
   validating the one of the child entities connected to the local domain on the trust chain by verifying the one of the child entities remains associated with the remote domain; and
   controlling access by the one of the child entities to the secure enterprise computing network based on the trust chain.

2. The method of claim 1, wherein the request for access includes one or more attributes of the one of the child entities associated with the remote domain and the controlling access is also based on the one or more attributes.

3. The method of claim 2, wherein the controlling access comprises:
   controlling access for the one of the child entities in a bulk transaction with a second of the child entities when the one of the child entities and the second of the child entities share at least one of the one or more attributes.

4. The method of claim 1, wherein at least one of the one or more outside entities is an outside device that has a unique identity within the identity management system and the method further comprises:
   registering the outside device with the identity management system.

5. The method of claim 1, wherein at least one of the one or more outside entities is an outside device that has a unique identity within the identity management system and the method further comprises:
   creating an instant message and presence protocol channel between the outside device and the identity management system enabling direct communication between the outside device and the identity management system.

6. The method of claim 1, wherein the one or more outside entities are partner employees that are indirectly associated with the local domain.

7. The method of claim 1, further comprising: generating an orphaned portion of the trust chain comprising the one of the child entities that is automatically removed from the trust chain when a validation of the parent entity expires; verifying a new parent entity of the one or more outside entities has also been given the delegation authority to add child entities to the trust chain; and re-parenting the orphaned portion of the trust chain to rebuild the trust chain using the new parent entity.

8. An identity management system, comprising:
   memory;
   one or more network interfaces; and
   at least one processor configured to:
      store in the memory data representing a trust chain formed between a local domain and a remote domain, wherein the local domain has an associated secure enterprise computing network, and wherein the trust chain identifies one or more outside entities associated with the remote domain that are authorized to access the secure enterprise computing network;
      grant a delegation authority to a parent entity among the one or more outside entities associated with the remote domain, wherein the delegation authority enables the parent entity to add outside entities to the trust chain as child entities;
      store in the memory data indicating that the parent entity has been granted the delegation authority to add child entities so that the child entities associated with the remote domain can access the secure enterprise computing network of the local domain;
      receive a request for access to the secure enterprise computing network by one of the child entities associated with the remote domain;
      validate the one of the child entities connected to the local domain on the trust chain by verifying the one of the child entities remains associated with the remote domain; and
      control access by the one of the child entities to the secure enterprise computing network based on the trust chain.

9. The identity management system of claim 8, wherein the request for access includes one or more attributes of the one of the child entities associated with the remote domain and the controlling access is also based on the one or more attributes.

10. The identity management system of claim 9, wherein to control access, the processor is configured to:
    control access for the one of the child entities in a bulk transaction with a second of the child entities when the one of the child entities and the second of the child entities share at least one of the one or more attributes.

11. The identity management system of claim 8, wherein at least one of the one or more outside entities is an outside device that has a unique identity within the identity management system and the processor is further configured to:
    register the outside device with the identity management system.

12. The identity management system of claim 8, wherein at least one of the one or more outside entities is an outside device that has a unique identity within the identity management system, and the processor is further configured to:
    create an instant message and presence protocol channel between the outside device and the identity management system enabling direct communication between the outside device and the identity management system.

13. The identity management system of claim 8, wherein the one or more outside entities are partner employees that are indirectly associated with the local domain.

14. The identity management system of claim 8, wherein the processor is further configured to:
generate an orphaned portion of the trust chain comprising the one of the child entities that is automatically removed from the trust chain when a validation of the parent entity expires;
verify a new parent entity of the one or more outside entities has also been given the delegation authority to add child entities to the trust chain; and
re-parent the orphaned portion of the trust chain to rebuild the trust chain using the new parent entity.

15. A non-transitory computer readable storage media encoded with instructions that, when executed by a processor of a network device, cause the processor to:
store, in an identity management system, data representing a trust chain formed between a local domain and a remote domain, wherein the local domain has an associated secure enterprise computing network, and wherein the trust chain identifies one or more outside entities associated with the remote domain that are authorized to access the secure enterprise computing network;
grant a delegation authority to a parent entity among the one or more outside entities associated with the remote domain, wherein the delegation authority enables the parent entity to add outside entities to the trust chain as child entities;
store, in the identity management system, data indicating that the parent entity has been granted the delegation authority to add child entities so that the child entities associated with the remote domain can access the secure enterprise computing network of the local domain;
receive, at the identity management system, a request for access to the secure enterprise computing network by one of the child entities associated with the remote domain;
validate the one of the child entities connected to the local domain on the trust chain by verifying the one of the child entities remains associated with the remote domain; and
control access by the one of the child entities to the secure enterprise computing network based on the trust chain.

16. The non-transitory computer readable storage media of claim 15, wherein the request for access includes one or more attributes of the one of the child entities associated with the remote domain and the controlling access is also based on the one or more attributes.

17. The non-transitory computer readable storage media of claim 16, wherein the instructions operable to control access further comprise instructions operable to:
control access for the one of the child entities in a bulk transaction with a second of the child entities when the one of the child entities and the second of the child entities share at least one of the one or more attributes.

18. The non-transitory computer readable storage media of claim 15, wherein at least one of the one or more outside entities is an outside device that has a unique identity within the identity management system and the instructions further comprise instructions operable to:
create an instant message and presence protocol channel between the outside device and the identity management system enabling direct communication between the outside device and the identity management system.

19. The non-transitory computer readable storage media of claim 15, wherein the one or more outside entities are partner employees that are indirectly associated with the local domain.

20. The non-transitory computer readable storage media of claim 15, further comprising instructions operable to:
generate an orphaned portion of the trust chain comprising the one of the child entities that is automatically removed from the trust chain when a validation of the parent entity expires;
verify a new parent entity of the one or more outside entities has also been given the delegation authority to add child entities to the trust chain; and
re-parent the orphaned portion of the trust chain to rebuild the trust chain using the new parent entity.

* * * * *